United States Patent
Tokashiki

(10) Patent No.: US 7,957,024 B2
(45) Date of Patent: Jun. 7, 2011

(54) BOOKBINDING DEVICE, BOOKBINDING METHOD, AND PRINTING DEVICE

(75) Inventor: Kiyoshi Tokashiki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1123 days.

(21) Appl. No.: 11/621,657

(22) Filed: Jan. 10, 2007

(65) Prior Publication Data

US 2007/0187882 A1    Aug. 16, 2007

(30) Foreign Application Priority Data

Jan. 30, 2006   (JP) ................... 2006-020972

(51) Int. Cl.
*G06F 3/12*    (2006.01)
*G06K 15/00*   (2006.01)
*G03G 15/00*   (2006.01)
*B42C 11/00*   (2006.01)
*B42C 9/00*    (2006.01)

(52) U.S. Cl. .......... 358/1.18; 358/1.13; 399/408; 412/4; 412/8

(58) Field of Classification Search .................. None
See application file for complete search history.

(56) References Cited

U.S. PATENT DOCUMENTS

| 5,383,754 | A  | * | 1/1995 | Sumida et al. ............... 412/11 |
| 5,760,912 | A  | * | 6/1998 | Itoh .............................. 358/296 |
| 5,881,352 | A  | * | 3/1999 | Kobayashi et al. ......... 399/408 |
| 2002/0016799 | A1 | * | 2/2002 | Nakagiri et al. ............. 707/517 |
| 2004/0098665 | A1 | * | 5/2004 | Kasahara et al. ............ 715/500 |
| 2005/0158068 | A1 | * | 7/2005 | Nakamura et al. ............ 399/82 |
| 2005/0225020 | A1 | * | 10/2005 | Fukatsu et al. ................. 270/18 |

FOREIGN PATENT DOCUMENTS

JP   2004-155152 A   6/2004

* cited by examiner

*Primary Examiner* — King Y Poon
*Assistant Examiner* — Ming Hon
(74) *Attorney, Agent, or Firm* — Canon USA Inc. IP Division

(57) ABSTRACT

A bookbinding system sets one of a right-opening bookbinding mode for feeding a cover sheet on which a cover is laid out at the left of a spine portion thereof to generate a right-opening book, and a left-opening bookbinding mode for feeding a cover sheet on which a cover is laid out at the right of the spine portion to generate a left-opening book. Also, the bookbinding system executes rotating processing for changing the top-and-bottom directions of image data depending on whether the right-opening bookbinding mode or the left-opening bookbinding mode is set so as to print image data that should be the top page, of image data of multiple pages, on a sheet serving as the top page of body, thereby appropriately generating a right-opening book and a left-opening book.

8 Claims, 27 Drawing Sheets

FIG. 9A

| BOX NUMBER | NAME | AMOUNT OF USE |
|---|---|---|
| 00 | nagashima | 1% |
| 01 | ushiyama | 2% |
| 02 | hara | 0% |
| 03 | hasegawa | 0% |
| 04 | | 0% |
| 05 | | 0% |
| 06 | | 0% |

1/15

REMAINING MEMORY AMOUNT
96%

SYSTEM STATUS/CANCEL

FIG. 9B

BOX / 03: hasegawa    TOTAL  6

| ✓ | TYPE | DOCUMENT NAME | STATUS | SHEET SIZE | PAGES | DATE/TIME |
|---|---|---|---|---|---|---|
| | | abc.doc | UNPRINTED | A4 | 20 | 11/05 10:34 |
| | | test.doc | UNPRINTED | A4 | 100 | 11/06 13:00 |
| | | list.doc | UNPRINTED | A4 | 10 | 11/07 14:32 |
| | | S2000.pdf | UNPRINTED | A4 | 24 | 11/07 15:03 |
| | | test2.doc | PRINTED | A4 | 320 | 11/07 18:00 |
| | | Jamp.doc | UNPRINTED | A4 | 69 | 11/10 14:20 |

1/1

☐ SELECT ALL

CLOSE

SYSTEM STATUS/CANCEL

BOOKBINDING DEVICE, BOOKBINDING METHOD, AND PRINTING DEVICE

BACKGROUND OF THE INVENTION

1. Field of the Invention

The present invention relates to a bookbinding device, a bookbinding method, and a printing device.

2. Description of the Related Art

Heretofore, bookbinding devices have been known wherein a bound article (book) is constructed by binding a cover sheet to a sheet bundle made up sheets of multiple pages on which covers (e.g., a front cover and a back cover) are laid out.

As for binding a cover sheet to a sheet bundle, various methods have been proposed. As one example thereof, a case binding method has been known wherein the central portion of a cover sheet greater than the sheet size of a sheet bundle (e.g., an A3 cover sheet corresponding to an A4 sheet bundle) is glued with one edge of the sheet bundle, and the sheet bundle is wrapped in the cover sheet.

With a conventional bookbinding method, processing for creating sheet bundles each serving as the body of a book, and processing for creating cover sheets are separately performed, and the created sheet bundles and cover sheets are each set in a bookbinding device, thereby executing bookbinding processing. With this bookbinding method, setting of the sheet bundles and cover sheets in the bookbinding device is manually performed by an operator of the bookbinding device.

Further, a bookbinding device has been proposed wherein creation of sheet bundles and cover sheets, and bookbinding processing using these are executed as a series of processing without involvement of operations by an operator to reduce manual works by an operator (e.g., see Japanese Patent Laid-Open No. 2004-155152).

Incidentally, as for books, there are two types; a right-opening book and a left-opening book. Now, description will be made regarding the difference between a right-opening book and a left-opening book with reference to FIGS. 10A through 13.

FIGS. 10A through 10D are diagrams illustrating the configuration of a left-opening book, and FIG. 11 is a diagram illustrating the configuration of a cover sheet for creating a left-opening book. Also, FIGS. 12A through 12D are diagrams illustrating the configuration of a right-opening book, and FIG. 13 is a diagram illustrating the configuration of a cover sheet for creating a right-opening book. With FIGS. 10A through 13, reference numerals 1000 through 1002 denote regions on a cover sheet. Reference numeral 1002 denotes a spine region serving as the spine of a product article, 1000 denotes a region positioned right of the spine region 1002, and 1001 denotes a region positioned left of the spine region 1002.

In the event that "A" is laid out as a front cover and "B" is laid out as a back cover on a cover sheet, the layouts of a front cover and a back cover as to a cover sheet differ between the case of creating a left-opening book and the case of creating a right-opening book. That is to say, with a cover sheet for creating a left-opening book (FIG. 11), a front cover is laid out in the region 1000 (FIG. 10A), and a back cover is laid out in the region 1001 (FIG. 10B). On the other hand, with a cover sheet for creating a right-opening book (FIG. 13), a back cover is laid out in the region 1000 (FIG. 12A), and a front cover is laid out in the region 1001 (FIG. 12B).

Also, the direction for turning over a front cover differs depending on the case of creating a left-opening book or the case of creating a right-opening book. That is to say, with a left-opening book, the first page of the body appears by turning over the front cover to the left (FIG. 10C), but with a right-opening book, the first page of the body appears by turning over the front cover to the right (FIG. 12D).

In order to appropriately create a right-opening book and a left-opening book including the above differences, it has been necessary to artificially arrange the layouts of covers as to a cover sheet, and bookbinding works using the cover sheet thereof. However, with the bookbinding device described in Japanese Patent Laid-Open No. 2004-155152 for executing creation of sheet bundles and cover sheets, and bookbinding processing using these as a series of processing, it has been difficult to create an appropriate book taking into consideration such an arrangement.

SUMMARY OF THE INVENTION

Embodiments of the present invention have been made in light of the above points, and provides an improved bookbinding device, bookbinding method, and printing device.

Embodiments of the present invention provide a bookbinding device, a bookbinding method, and a printing device wherein when executing generations of sheet bundles and cover sheets, and bookbinding processing using these as a series of processing, books are appropriately generated taking into consideration regarding whether right-opening books are generated or left-opening books are generated.

According to a first aspect of the present invention, a bookbinding apparatus comprises: an input unit configured to input image data of multiple pages; a printing unit configured to subject multiple sheets to print processing based on the image data of multiple pages input by the input unit; a stacking unit configured to stack the multiple sheets subjected to print processing by the printing unit as a sheet bundle; a paper-feed unit configured to feed a cover sheet; a bookbinding unit configured to generate a book by binding the cover to the sheet bundle; a mode setting unit configured to set one of a right-opening bookbinding mode for generating a right-opening book and a left-opening bookbinding mode for generating a left-opening book; and a rotating unit configured to execute rotating processing for changing the top and bottom directions of the image data so that a first direction of the image data in the right-opening bookbinding mode and a second direction of the image data in the left-opening bookbinding mode are opposite.

According to a second aspect of the present invention, a method for generating a book using a sheet bundle made up of multiple sheets serving as body, and a cover sheet. The method comprises: receiving image data of multiple pages; setting one of a right-opening bookbinding mode for generating a right-opening book and a left-opening bookbinding mode for generating a left-opening book; executing rotating processing for changing the top and bottom directions of the image data so that a first direction of the image data in the right opening bookbinding mode and a second direction of the image data in the left-opening bookbinding mode are opposite; subjecting multiple sheets to print processing based on the image data of multiple pages passing through the rotating process, and subjecting one sheet to print processing based on image data of one page; and binding a cover sheet to a sheet bundle made up of multiple sheets subjected to print processing in the printing process.

According to a third aspect of the present invention, a printing apparatus capable of connecting to a bookbinding apparatus. The bookbinding apparatus includes a stacking unit configured to stack a sheet bundle, a paper-feed unit configured to feed a cover sheet, and a bookbinding unit configured to generate a book by binding the cover sheet to the sheet bundle. The printing apparatus comprises: an input unit configured to input image data of multiple pages; a printing unit configured to subject multiple sheets to print processing based on the image data of multiple pages input by the input unit to stack these in the stacking unit of the bookbinding device; a mode setting unit configured to set one of a right-opening bookbinding mode for generating a right-opening book and a left-opening bookbinding mode for generating a left-opening book; and a rotating unit configured to execute rotating processing for changing the top and bottom directions of the image data so that a first direction of the image data in the right-opening bookbinding mode and a second direction of the image data in the left-opening bookbinding mode are opposite.

As many apparently widely different embodiments of the present invention can be made without departing from the spirit and scope thereof, it is to be understood that the invention is not limited to the specific embodiments thereof except as defined in the appended claims.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments, features and aspects of the invention and, together with the description, serve to explain the principles of the invention.

FIGS. 9A through 9D are diagrams illustrating one example of an operating screen displayed on the liquid crystal display unit illustrated in FIG. 4.

DESCRIPTION OF THE EMBODIMENTS

Figure 1:
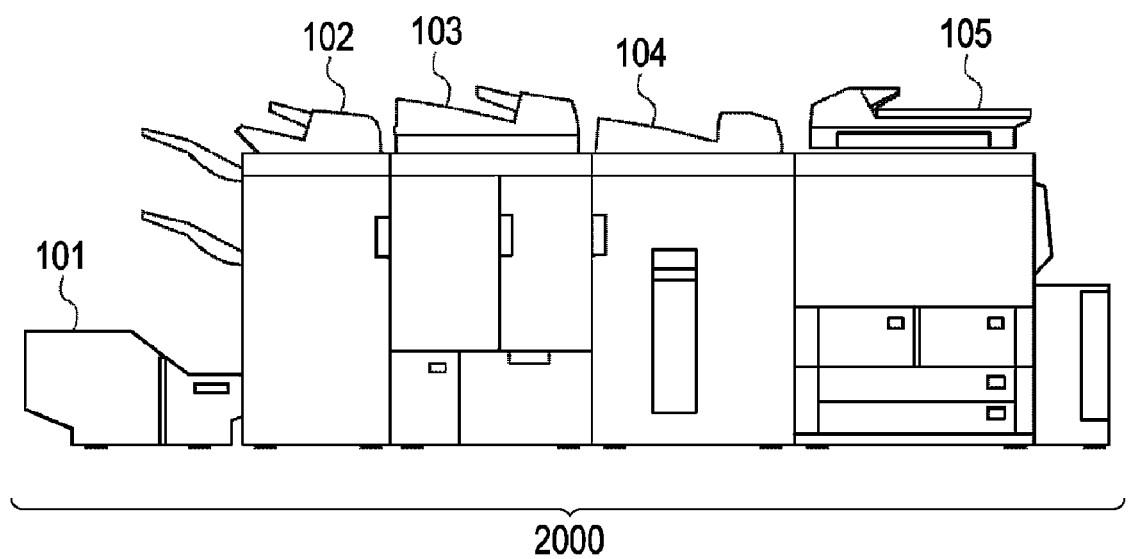
FIG. 1 is a diagram illustrating the overall configuration of a bookbinding system (bookbinding device).

The present invention will now be described in detail with reference to the drawings showing various embodiments thereof. In the drawings, elements and parts which are identical throughout the views are designated by identical reference numerals, and duplicate description thereof is omitted.

First Exemplary Embodiment

Overall configuration of Bookbinding System

Bookbinding Device

FIG. 1 is a diagram illustrating the overall configuration of a bookbinding system (bookbinding device) corresponding to an embodiment of the present invention.

In FIG. 1, reference numeral 105 denotes a printing device, which subjects sheets to print processing based on image data, and also conveys sheets subjected to print processing to a stacker device 104. The stacker device 104 stacks sheets conveyed from the printing device 105 in a stack tray (not shown). The stacker device 104 can also convey the sheets conveyed from the printing device 105 to a case binding device 103 without stacking those in the stack tray. As seen by referring to FIG. 8, the case binding device 103 loads multiple sheets S conveyed from the printing device 105 via the stacker device 104 into a later-described stacking tray 42 as a sheet bundle S1. Subsequently, the case binding device 103 creates a book by wrapping the sheet bundle S1 loaded into the stacking tray 42 in a cover sheet S2 loaded into a later-described cover-sheet loading tray 70.

Note that the case binding device 103 can convey the sheets S conveyed from the stacker device 104 to a saddle stitching device 102 without these loading into the stacking tray 42. The saddle stitching device 102 creates a saddle stitching article by subjecting the sheet bundle S1 made up of the multiple sheets S, which are conveyed from the printing device 105 via the case binding device 103, to staple processing. Note that the saddle stitching article created by the saddle stitching device 102 is conveyed to a sheet-cutting device 101, and is subjected to sheet cutting processing.

Note that in FIG. 1, the bookbinding system (bookbinding device) 2000 is configured of the printing device 105, stacker device 104, case binding device 103, saddle stitching device 102, and sheet cutting device 101, but other configurations may be employed. At least the printing device 105 and the case binding device 103 are combined, whereby the bookbinding system (bookbinding device) 2000 corresponding to the present embodiment can be configured.

<Control Configuration of Printing Device>

Figure 2:
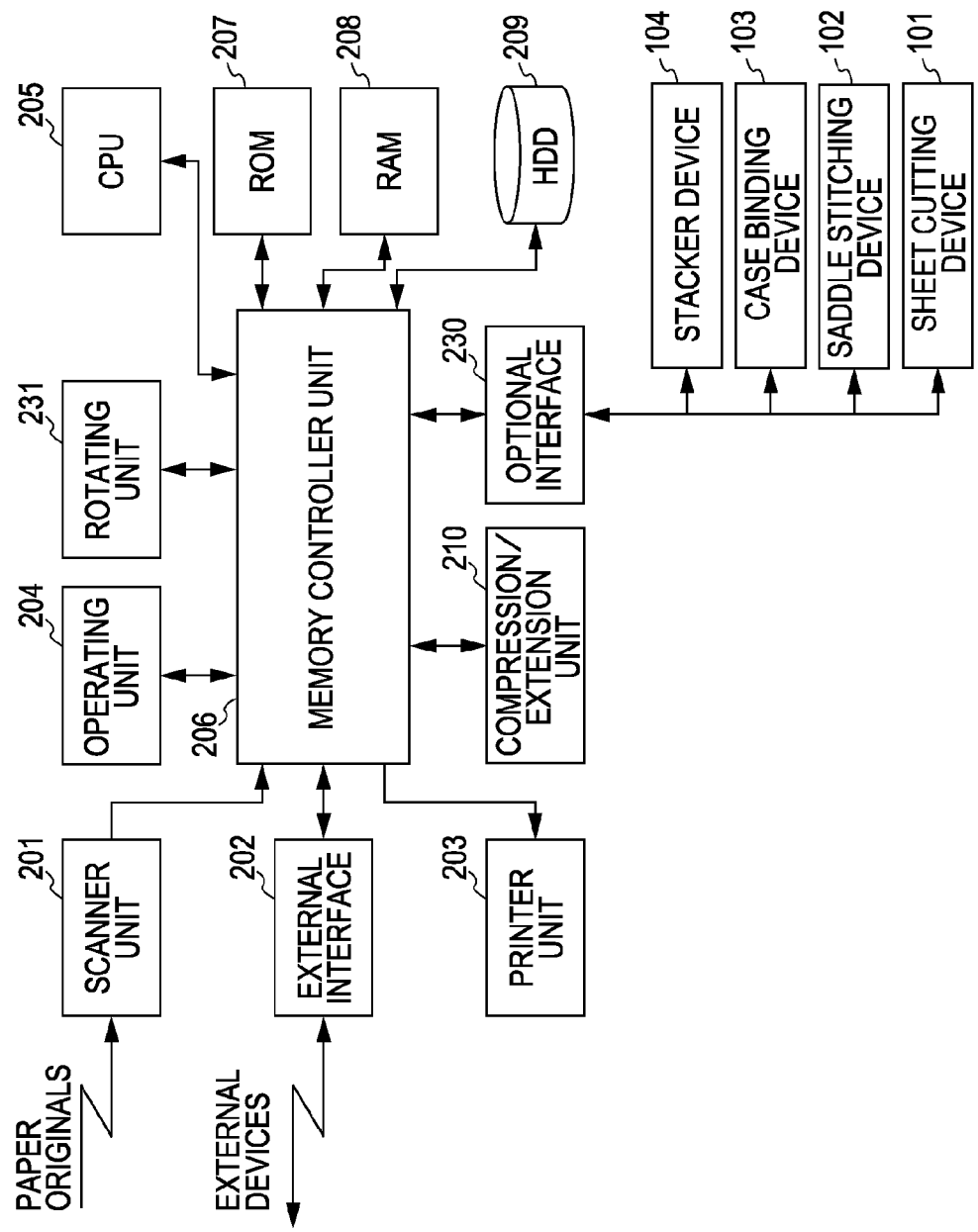
FIG. 2 is a block diagram illustrating the control configuration of a printing device 105.

FIG. 2 is a block diagram illustrating the control configuration of the printing device 105 corresponding to an embodiment of the present invention.

In FIG. 2, reference numeral 201 denotes a scanner unit, which optically scans multiple original sheets (sheets such as paper on which an image is printed) to generate image data, and also subjects the read image data to image processing (e.g., shading correction processing). The scanner unit 201 then stores the image data of multiple pages subjected to image processing in a hard disk (HDD) 209 as one print job. Reference numeral 202 denotes an external interface, which receives a print job including image data of multiple pages from an external device connected to the printing device 105 via a network. The external interface 202 stores the received print job in the hard disk (HDD) 209. Reference numeral 203 denotes a printer unit, which subjects multiple sheets S to print processing based on the print job stored in the hard disk 209. Note that the print job is made up of image data of multiple pages, so that a plurality of image data is printed upon each of multiple sheets. Reference numeral 204 denotes an operating unit, which accepts various types of instruction by an operator of the printing device 105, and transmits the accepted instruction to a memory controller unit 206, thereby performing various types of setting upon the printing device 105.

CPU 205 writes a program read out from ROM 207 in RAM 208, and executes the program using the RAM 208, thereby controlling the entirety of the bookbinding system 2000 including the printing device 105. Note that ROM 207 stores a program for interpreting PDL (Page Description Language) code data that the external interface 202 received from an external device as a print job. The ROM 207 further stores a program for generating data that can be printed at the printer unit 203 following interpretation of PDL code data. The memory controller unit 206 controls access from the respective units as to the ROM 207, RAM 208, and hard disk 209.

A compression/extension unit 210 can subject the image data stored in the RAM 208 and hard disk 209 to compression processing using various types of compression method such as JBIG, JPEG, or the like. The compression/extension unit 210 can also execute extension processing for extending (decompressing) the image data subjected to compression processing by various types of compression method.

A rotating unit 231 executes rotating processing in the event that it is necessary to rotate image data when transmitting the image data stored in the hard disk 209 to the printer unit 203 to execute print processing. The rotating unit 231 can execute arbitrary angle rotating processing such as 180-degree rotating processing for inverting the top-and-bottom directions of image data, 90-degree rotating processing, or the like as rotating processing. In an embodiment, the setting of a rotating angle of rotating processing that the rotating unit 231 executes can be controlled by the CPU 205.

An optional interface 230 is an interface for the CPU 205 communicating with the stacker device 104, case binding device 103, saddle stitching device 102, and sheet cutting device 101 which are connected to the printing device 105 as optional devices. The stacker device 104, case binding device 103, saddle stitching device 102, and sheet cutting device 101 each include a CPU (not shown) for controlling the internal operations. The CPU 205 of the printing device 105 transmits a control command for controlling the CPU of each of the optional devices via the optional interface 230, thereby controlling the stacker device 104, case binding device 103, saddle stitching device 102, and sheet cutting device 101.

<Configuration of Printing Device>

Figure 3:
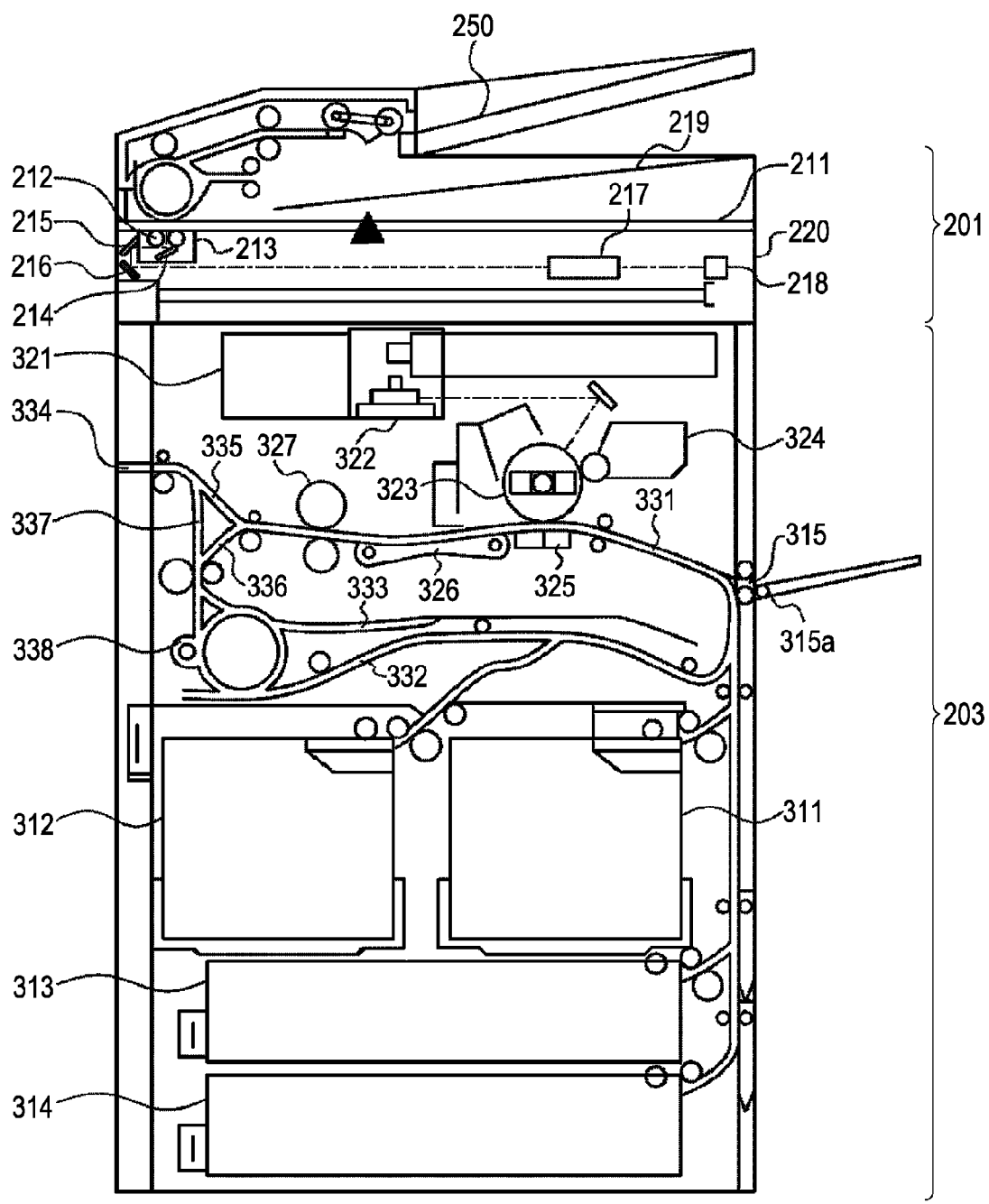
FIG. 3 is a cross-sectional view illustrating the configuration of the printing device 105.

Next, description will be made regarding an exemplary configuration of the printing device 105 with reference to FIG. 3.

The printing device 105 generally includes the scanner unit 201, and the printer unit 203. The scanner unit 201 sequentially feeds the sheet bundle loaded in a document feeder unit 250 onto a platen glass 211 from the top thereof (the uppermost portion) one by one in accordance with the loading sequence thereof. The document feeder unit 250 then discharges the scanned sheet onto a discharge tray 219 following completion of scan operation by a scanner 220. Upon an original sheet being conveyed onto the platen glass 211, the scanner unit 220 turns on a lamp 212, controls an optical unit 213 to move, and scans the sheet-shaped original while illuminating this from below. The reflected light from the original is passed through multiple mirrors 214, 215, 216, and a lens 217, and is guided to a CCD image sensor (hereafter, CCD) 218, and the image on the scanned original is read by the CCD 218 as image data. The image data read by the CCD 218 is subjected to predetermined image processing, following which is stored in the hard disk 209.

The printer unit 203 outputs from a laser-light-emitting unit 322 driven by a laser driver 321 laser light corresponding to the image data read out from the hard disk 209. An electrostatic latent image corresponding to laser light is formed on a photosensitive drum 323 upon which laser light is illuminated, and a developing unit 324 adheres a developing agent (e.g., toner) at the electrostatic latent image portion.

On the other hand, a sheet S is fed from one of a cassette 311, a cassette 312, a cassette 313, a cassette 314, and a hand feed tray 315 at the timing in sync with start of illumination of laser light, and is conveyed to a transfer unit 325 via a conveyance channel 331. Here, the hand feed tray 315 is provided with a sheet detection sensor 315a for detecting that the sheet S is loaded. The transfer unit 325 transfers the developing agent adhered to the photosensitive drum 323 onto the sheet S. The sheet S on which the developing agent is transferred is conveyed to a fixing unit 327 by a conveyance belt 326, and is heated at the fixing unit 327. Thus, the developing agent on the sheet S is fixed to the sheet S. The sheet S on which the developing agent is fixed is conveyed to the stacker device 104 via conveyance channels 335 and 334. In the event of inverting and then conveying the sheet S at the time of conveying the sheet S to the stacker device 104, the CPU 205 controls the printer unit 203 to guide the sheet S to conveyance channels 336 and 338. Subsequently, the CPU 205 conveys the sheet S in the opposite direction to the stacker device 104 via conveyance channels 337 and 334.

<Configuration of Case Binding Device>

Figure 8:
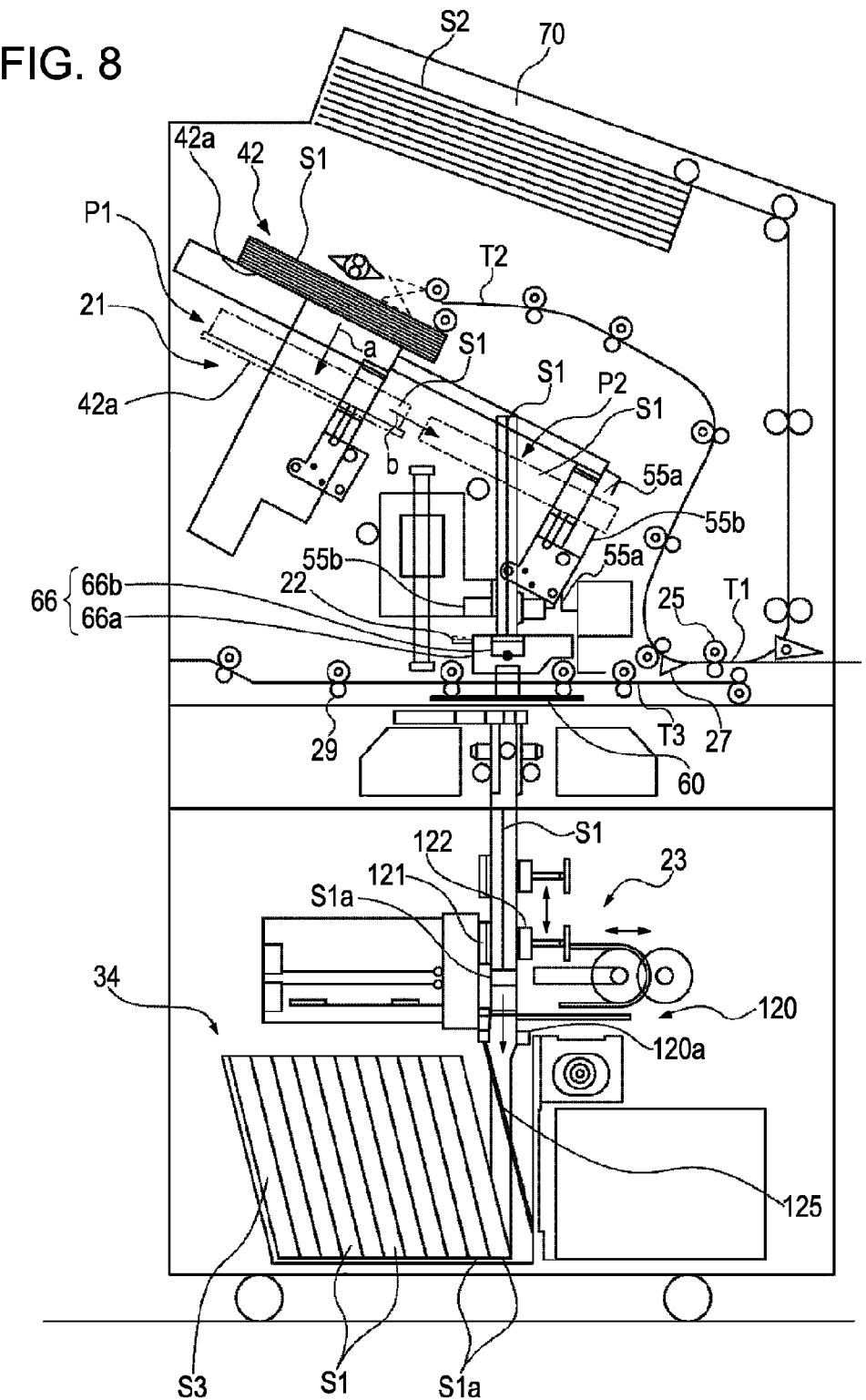
FIG. 8 is a diagram illustrating the configuration of a case binding device.

Next, description will be made regarding an exemplary configuration of the case binding device 103 with reference to FIG. 8.

The case binding device 103 includes at least a conveyance matching unit 21 for conveying and matching the sheets S, an adhesive application unit 22, and a sheet cutting unit 23. Note that as for sheet cutting in the sheet cutting unit 23, three sides other than the adhesive side of the sheet bundle S1 can be subjected to sheet cutting.

The conveyance matching unit 21 includes a first conveyance channel T1 for conveying the sheet S conveyed from the printing device 105 via the stacker device 104, and second and third conveyance channels T2 and T3 which are branched from the first conveyance channel T1 in a two-forked manner. The first conveyance channel T1 is provided with a carry-in roller pair 25, and with a branched portion between the second conveyance channel T2 and the third conveyance channel T3 at the downstream side of this carry-in roller pair 25, a changeover flapper 27 for changing over a conveyance channel is provided.

With such a conveyance channel arrangement, upon the CPU 205 selecting a normal discharge mode, the sheet S carried in the case binding device 103 from the printing device 105 via the first conveyance channel T1 is guided to the third conveyance channel T3 by the changeover flapper 27. Subsequently, the sheet S is conveyed to the saddle stitching device 102 via multiple conveyance roller pairs 29 provided in the third conveyance channel T3. On the other hand, upon the CPU 205 selecting a case binding mode, the sheet S is guided to the second conveyance channel T2 by the changeover flapper 27, and also is further conveyed to the stacking tray 42 making up the matching area of the conveyance matching unit 21. This stacking tray 42 includes a reception unit 42a for receiving the sheet S, a certain number of sheets S are loaded in a tilt state by this reception unit 42a, thereby forming one sheet bundle S1.

Also, upon the sheet bundle S1 made up of a certain number of sheets S being formed, the reception unit 42a is moved only a predetermined distance downward, toward a position P1 (direction of arrow a), following which is moved only a predetermined distance in the direction orthogonal to the movement direction thereof (direction of arrow b) (obliquely downward), thereby being positioned at a position P2. Such movement of the reception unit 42a is performed by a movement mechanism not shown in detail.

Also, grippers (conveyance means) 55a and 55b for retaining the edge portion of the sheet bundle S1 loaded onto the reception unit 42a are provided at the second position P2. These grippers 55a and 55b orient the retained sheet bundle S1 generally in the vertical direction (erect the retained sheet bundle S1 generally in the vertical direction). Subsequently, the grippers 55a and 55b move the retained sheet bundle S1 downward toward the adhesive application unit 22 while keeping the generally vertical state thereof (one edge of the sheet bundle S1 (the edge where a later-described adhesive is applied) is oriented downward).

Subsequently, the sheet bundle S1 is positioned at a certain position on an application area in a generally vertical state in the movement route of an adhesive unit 66. Next, the adhesive unit 66, which stands by at a standby position, is moved to a predetermined origin of the application area. Subsequently, the adhesive unit 66 is moved toward a predetermined turning position from the origin in a state in which an application roller 66b is positively rotated, and abuts on the edge of the sheet bundle S1. Thus, the edge of the sheet bundle S1 is coated with an adhesive agent evenly by the application roller 66b holding an adhesive agent within a container 66a on the surface thereof.

Upon the adhesive unit 66 arriving at the above turning position, the rotation of the application roller 66b is stopped, and the movement of the adhesive unit 66 is also stopped. Subsequently, from this point the adhesive unit 66 starts to move toward the origin from the turning position in a state in which the application roller 66b is rotated in the other direction. Subsequently, at a stage wherein the adhesive unit 66 arrives at the origin again, the inverse rotation of the application roller 66b is stopped, and the movement of the adhesive unit 66 is also stopped. Subsequently, such reciprocating movement is performed twice for example, following which application of the adhesive agent is completed.

Upon applying of the adhesive agent as to the edge of the sheet bundle S1 being completed, the adhesive unit 66 is moved to the standby position or supplementary position, and the conveyance route of the sheet bundle S1 is secured. Subsequently, the sheet bundle S1 held by the grippers 55a and 55b is moved to a cover adhesive unit 60 downwards through the generally vertical conveyance route (in the direction intersecting the movement direction of the adhesive unit 66).

A cover sheet S2 has already been conveyed from a cover sheet loading tray 70 to the cover adhesive unit 60, and has stood by until the adhesive agent is thus applied at the edge of the sheet bundle S1. Subsequently, the reverse side of a spine cover region 1002 of the cover sheet S2 is positioned at a certain position of the cover adhesive unit 60 crossing the generally vertical conveyance route of the sheet bundle S1. The edge of the sheet bundle S1 applied with the adhesive agent is pressed against the cover sheet S2 thus positioned by the grippers 55a and 55b in the vertical direction from above. Also, in this state, the sheet bundle S1 is further moved vertically downwards by the grippers 55a and 55b while the edge thereof is adhered with the cover sheet S2 by the adhesive agent, and is pressed against a slidable collision plate 50 positioned at the lower side of the cover adhesive unit 60. Subsequently, the cover sheet S2 and the sheet bundle S1 are pressed from both sides by a slidable spine folding plate in a state of being collided with the collision plate 50. Thus, the creases corresponding to the thickness of the sheet bundle S1 are formed on the cover sheet S2.

Next, the collision plate 50 is slide-moved outward, the conveyance route of the sheet bundle S1 is formed, following which grippers 55a and 55b hand over the sheet bundle S1 to which the cover sheet S2 is adhered to the lower sheet cutting unit 23 while holding this therebetween.

Next, description will be made regarding the sheet cutting unit 23.

Reference numeral 120 denotes a paper cutting unit, 121 denotes a rotating table, 122 denotes rotatable grippers for fixedly holding the sheet bundle S1 on the rotating table 121 therebetween. The paper cutting unit 120 includes a paper cutting blade 120a, a movable presser plate for pressing the edge portion of the sheet bundle S1 at the time of cutting sheets, a fixed presser plate, and a presser movement mechanism for driving these.

Upon the sheet bundle S1 to which the cover sheet S2 is adhered being handed over to the sheet cutting unit 23 by the grippers 55a and 55b, the sheet bundle S1 is conveyed in the vertical direction toward the paper cutting blade 120a. Upon the sheet bundle S1 being conveyed to the pager cutting blade 120a, the gripper 122 is driven, and then the sheet bundle S1 is firmly held between the gripper 122 and the rotating table 121.

Next, the paper cutting blade 120a moves to a predetermined position to form space necessary for rotating and moving the sheet bundle S1 based on the thickness information of the sheet bundle S1, and stands by there. Subsequently, the paper cutting blade 120a cuts one edge of the sheet bundle S1.

Upon one edge being cut, the presser plate and the paper cutting blade 120a move to a predetermined position to form space necessary for rotating and moving the sheet bundle S1 based on the thickness information of the sheet bundle S1 again, and stands by there. Subsequently again, the rotating table 121 and the gripper 122 are driven, and the sheet bundle S1 held between the rotating table 121 and the gripper 122 is rotated (180 degrees) and moved at a position where the next edge to be cut can be cut by the paper cutting blade 120a. Subsequently, the paper cutting blade 120a cuts one edge of the sheet bundle S1. Also, the paper cutting blade 120a cuts the third edge of the sheet bundle S1 by the same operation.

Thus, upon cutting of three edges being completed, the rotating table 121 is returned to the original position, and the sheet bundle S1 held between the gripper 122 and the rotating table 121 is conveyed to a storing unit 34 via a discharge roller. In this case, the sheet bundle S1 to be discharged from the discharge roller is jammed into the storing unit 34 by a flapper 125, and also is stacked and stored in a state in which an edge S1a on which an adhesive agent is applied is oriented downward, and generally vertically erected. Note that in the following description, the sheet bundle S1 to which the cover sheet S2 is adhered is referred to as a book S3.

<Configuration of Operating Unit>

Next, description will be made regarding the configuration of the operating unit 204 included in the printing device 105 with reference to FIG. 4.

The operating unit 204 comprises a hard key group 4-240 including various types of hard keys 4-241 through 4-246. The operating unit 204 also includes a liquid crystal display portion 4-250 made up of a dot matrix made up of a liquid crystal display device. The liquid crystal display portion 4-250 includes a touch panel on the surface thereof. The operating unit 204 detects that key input is made by the operator of the printing device 105 pressing a key display portion, and transmits the signal corresponding to key input to the CPU 205. Subsequently, the CPU 205 controls the printing device 105 based on the program stored in the ROM 207, and executes the operation corresponding to the received signal.

A key 4-243 is a power key, and is a key for turning on/off the power. A key 4-244 is a power saving key, and is a key for setting to a power saving mode or canceling the power saving mode. A start key 4-241 is a key for the operator inputting an instruction for starting various types of processing such as an instruction for starting the scan operation of an image on an original by the scanner unit 201. A stop key 4-242 is a key for the operator inputting an instruction for canceling the current operation by the bookbinding system 2000 including the printing device 105.

Also, a key group 4-245 includes a numeric key pad of 0 through 9 for inputting the number of copies, zoom magnification, and so forth, and a clear key for canceling input thereof. The number of copies input by this key group 4-245 is displayed on the liquid crystal display portion 4-253. A reset key 4-246 is a key for returning the setting conditions set by the operator via the liquid crystal display portion 4-250 and hard key group 4-240 to the initial state.

The liquid crystal display portion 4-250 displays the operation status and so forth of the bookbinding system 2000 in accordance with an instruction from the CPU 205. The liquid crystal display portion 4-250 also displays touch keys. With the liquid crystal display portion 4-250, a key 4-252 is a key for selecting a cassette in which the sheets S (paper) employed for print processing by the printing device 105 are loaded. Upon the operator pressing this key, the CPU 205 controls the operating unit 204 to display a sheet selection screen illustrated in FIG. 5A on the liquid crystal display portion 4-250.

Figure 4:
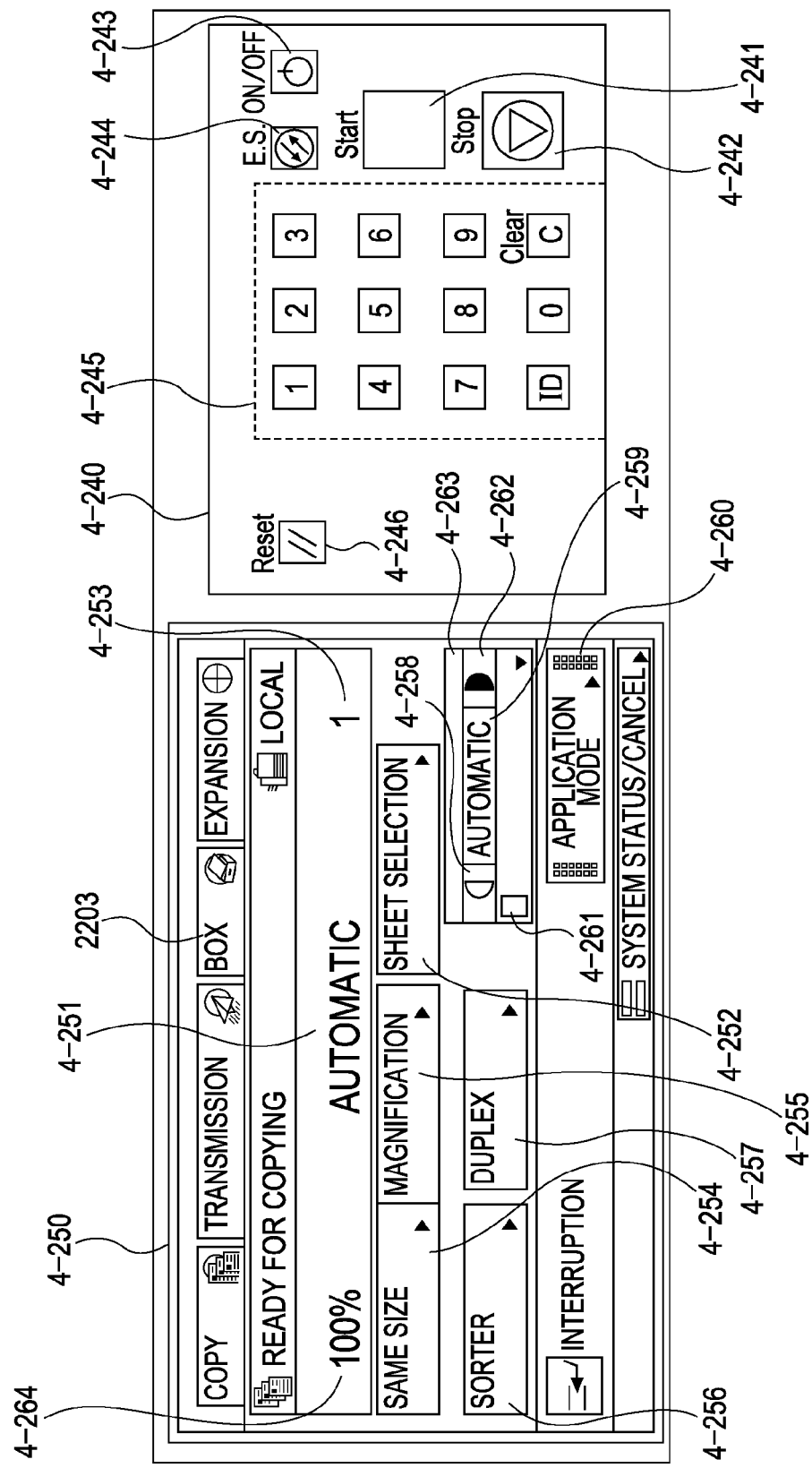
FIG. 4 is a diagram illustrating the configuration of an operating unit 204 included in the printing device 105.
Figure 5A:
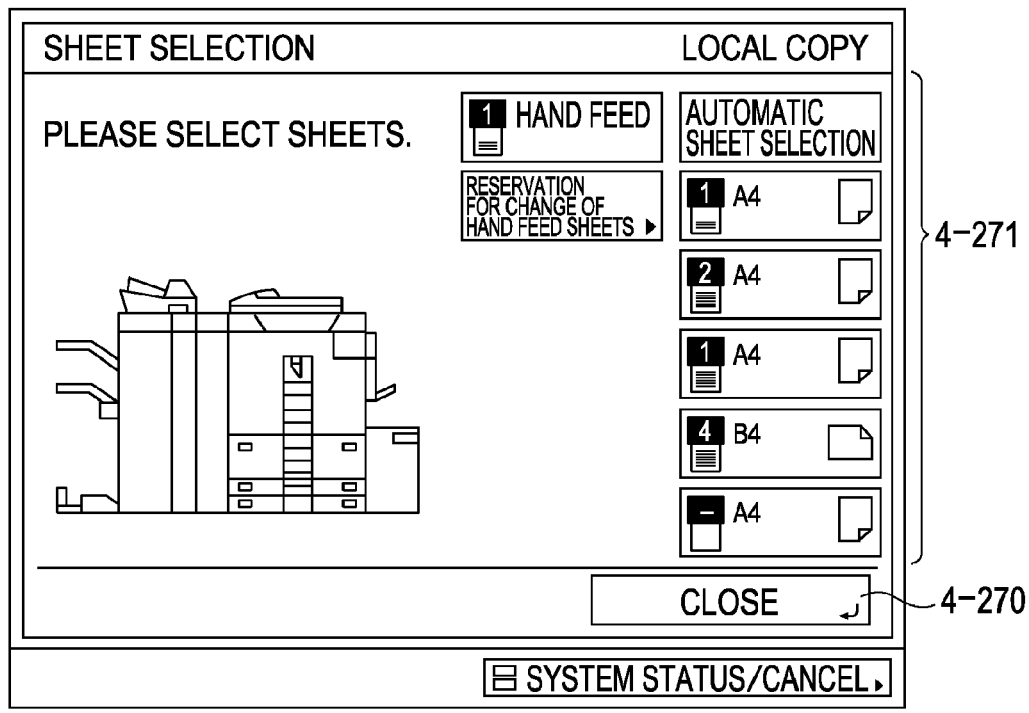
FIGS. 5A through 5D are diagrams illustrating one example of an operating screen displayed on the liquid crystal display unit illustrated in FIG. 4.

According to a key group 4-271 of the sheet selection screen illustrated in FIG. 5A, a cassette (one of cassettes 311 through 315) used for printing processing is selected. Subsequently, upon the operator pressing a close key 4-270, the CPU 205 closes this screen to return to the screen in FIG. 4, and displays the selected cassette on the display portion 4-251.

Keys 4-258 and 4-262 shown in FIG. 4 are keys for performing concentration adjustment. The CPU 205 displays the concentration adjusted by these keys on a display portion 4-263. A key 4-259 is a key for activating/inactivating an automatic concentration adjustment function. A key 4-261 is a key for performing settings such as a photo mode/text mode and so forth.

Figure 5B:
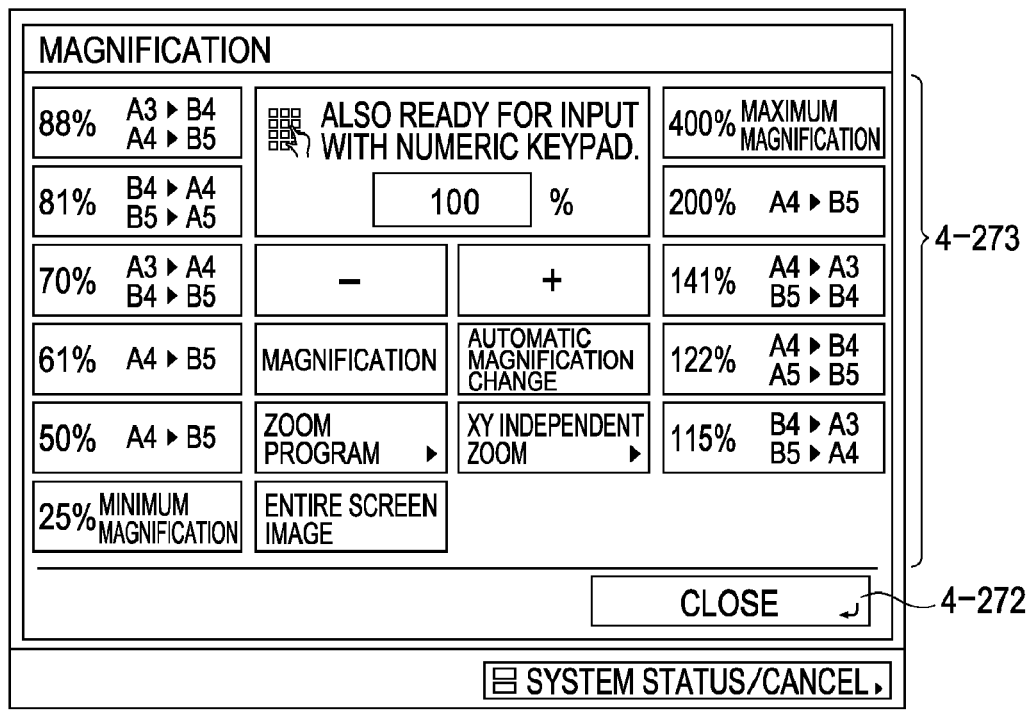

A key 4-254 and a key 4-255 are keys for setting same size, and reduction/enlargement, respectively. Upon the operator pressing the key 4-255, the CPU 205 displays the magnification screen illustrated in FIG. 5B on the liquid crystal display portion 4-250 to allow the operator to set enlargement/reduction in detail. Upon the operator selecting a magnification using a key group 4-273 of the magnification screen illustrated in FIG. 5B, and pressing a close key 4-272, the CPU 205 closes this screen to return to the screen in FIG. 4. Subsequently, the CPU 205 displays the magnification set in the previous operation on the display portion 4-264.

A key 4-257 is a duplex key. Upon the operator pressing the key 4-257, the CPU 205 displays the duplex print setting screen illustrated in FIG. 5C on the liquid crystal display portion 4-250. Description will be made below regarding the settings of duplex printing with reference to FIG. 5C.

Figure 5C:
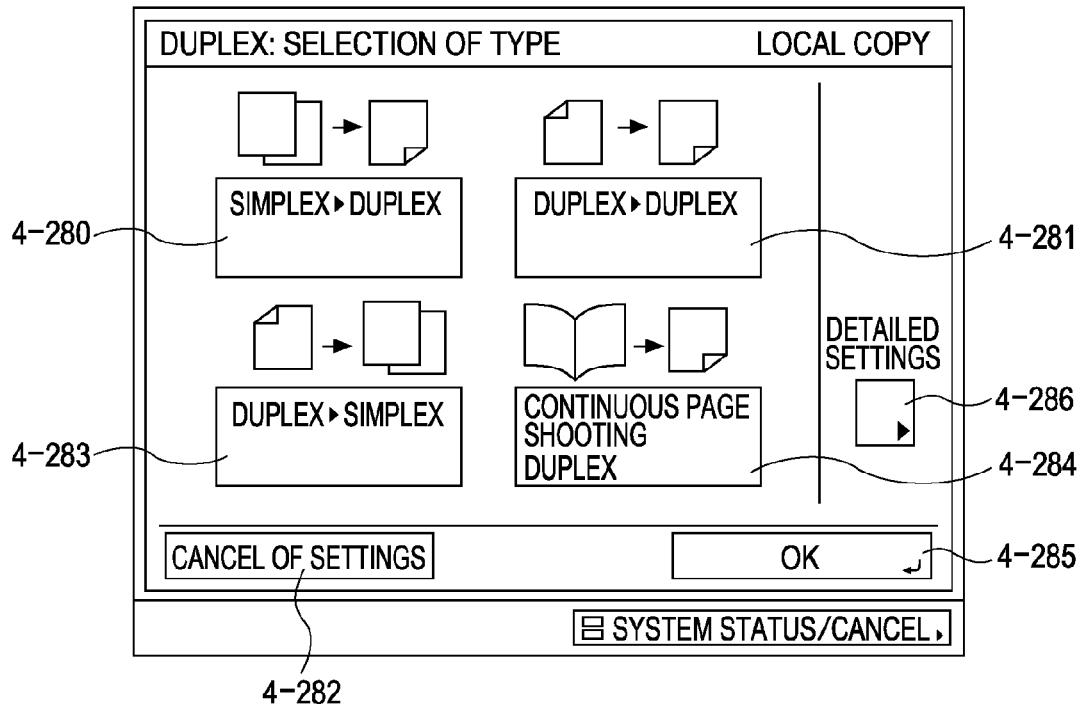

In FIG. 5C, a key 4-280 is a setting key for subjecting both sides of sheets to print processing using originals of which only one side is printed with an image (hereafter, simplex originals). A key 4-281 is a setting key for subjecting both sides of sheets to print processing using originals of which both sides are printed with an image (hereafter, duplex originals). A key 4-283 is a setting key for subjecting only one side of sheets to print processing using duplex originals. Also, a key 4-284 is a setting key for performing continuous page scanning to duplex.

A key 4-285 is a key for activating the settings performed by the operator in the duplex print setting screen in FIG. 5C. Upon the operator pressing this key, the CPU 205 activates the settings in the duplex print setting screen in FIG. 5C, and returns the display of the liquid crystal display portion 4-250 to the screen in FIG. 4. Also, a key 4-282 is a key for canceling the settings performed in FIG. 5C. Upon the operator pressing this key, the CPU 205 inactivates the settings in the duplex print setting screen in FIG. 5C, and returns the display of the liquid crystal display portion 4-250 to the screen in FIG. 4.

A key 4-286 is a key for allowing the operator (user) to perform detailed settings. Upon the operator pressing this key 4-286, the CPU 205 displays the screen illustrated in FIG. 5D on the liquid crystal display portion 4-250. Description will be made below regarding the detailed settings of duplex printing with reference to FIG. 5D.

Figure 5D:
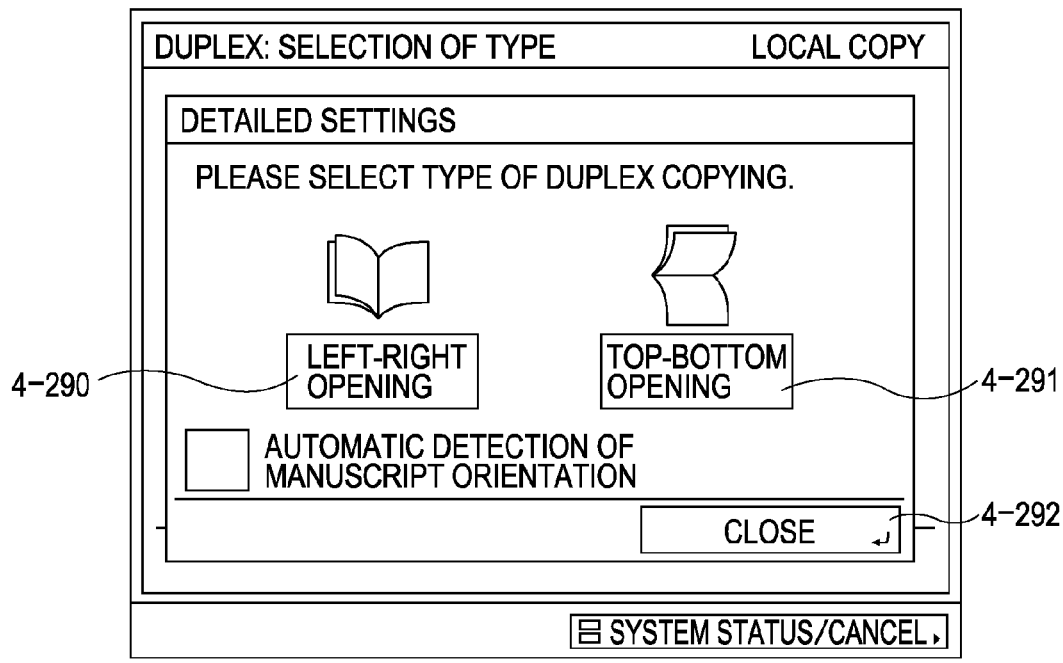

In FIG. 5D, a key 4-290 is a setting key for converting the sheets S subjected to print processing by the printing device 105 into a left-and-right-opening printed article, and a key 4-291 is a setting key for converting the sheets S into a top-and-bottom-opening printed article. Upon the operator selecting the type of duplex printing by the key 4-290 or key 4-291, and then pressing a close key 4-292, the CPU 205 closes this screen, and returns the display of the liquid crystal display portion 4-250 to the screen in FIG. 5C.

As described above, the duplex print setting screen in FIG. 5C and the duplex print detailed setting screen in FIG. 5D allow the operator to set duplex printing.

A key 4-256 on the display screen in FIG. 4 is a sorter key for allowing the operator (user) to input an instruction for displaying a setting screen for the operator instructing sheet processing to be executed by the sheet processing device 230 on the display portion of the operating unit 204.

Upon the operator pressing the key 4-256, the CPU 205 changes the display of the liquid crystal display portion 4-250 of the operating unit 204 into a later-described screen illustrated in FIG. 6C, for example. Subsequently, the CPU 205 shows candidates of sheet processing that the sheet processing device 230 can execute (case binding processing, saddle stitching) to the operator using the liquid crystal display unit 4-250 of the operating unit 204.

Figure 6A:
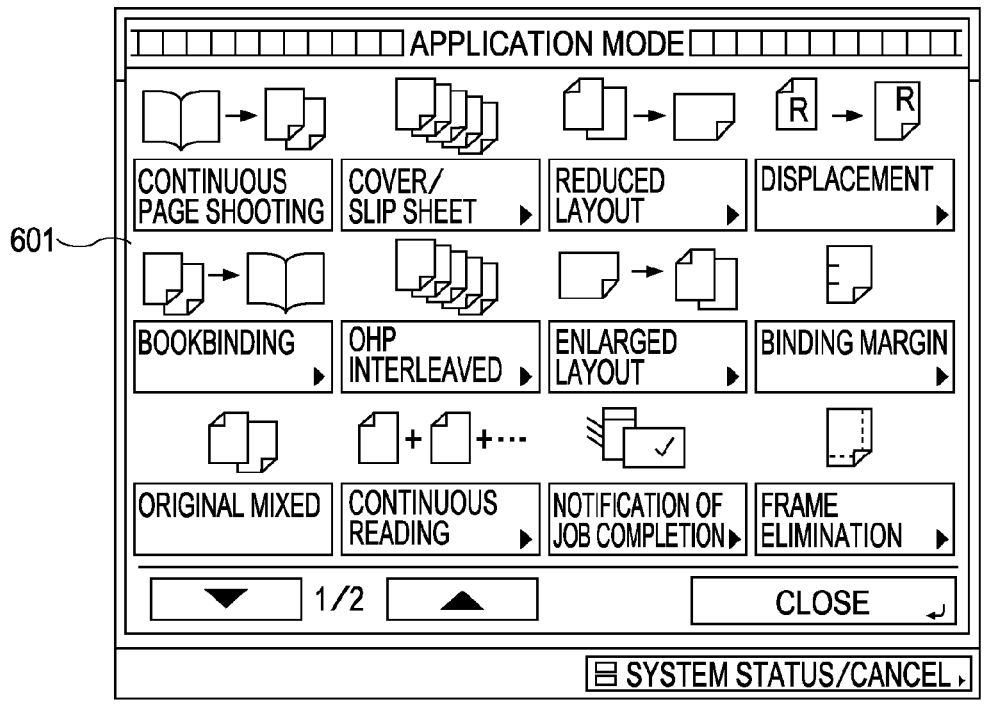
FIGS. 6A through 6C are diagrams illustrating one example of an operating screen displayed on the liquid crystal display unit illustrated in FIG. 4.
Figure 6B:
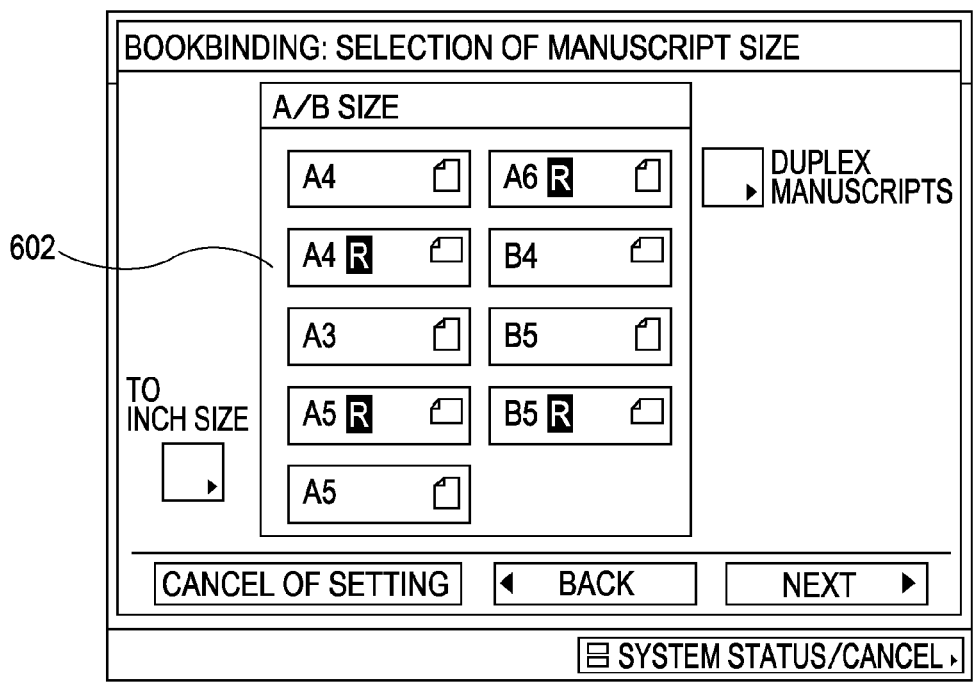
Figure 6C:
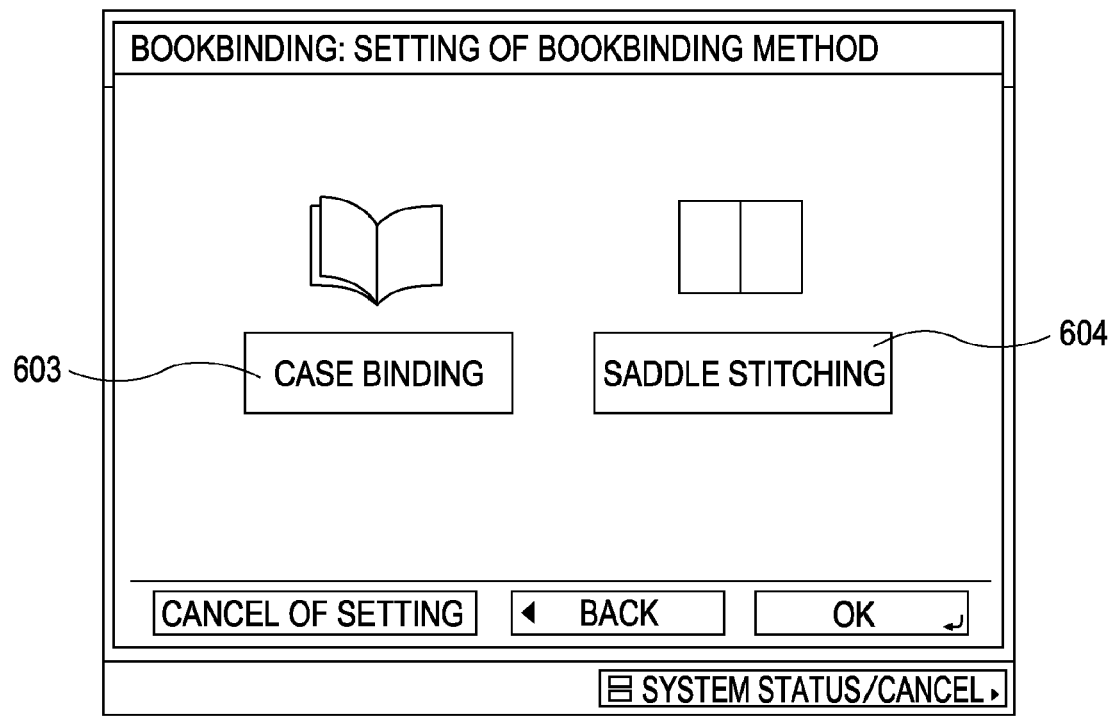

The CPU 205 accepts a desired sheet processing execution instruction from the operator via a sheet processing setting screen such as FIG. 6C. Subsequently, the CPU 205 controls the bookbinding system 2000 to execute the bookbinding processing selected by the operator via the sheet processing setting screen.

Description will be made below regarding the flow of bookbinding setting procedures in the bookbinding system 2000 according to the present embodiment with reference to FIGS. 6A through 6C.

Note that as for a method for inputting image data of multiple pages employed for print processing of the sheets S, there is a method for inputting this from the scanner unit 201 (hereafter, referred to as first input method). There is also a method for inputting this from the hard disk 209 (hereafter, referred to as second input method). Now, in the following, description will be made regarding each of the two input methods.

<Bookbinding Setting Procedures: First Input Method>

FIGS. 6A through 6C are diagrams illustrating one example of an operating screen displayed on the liquid crystal display portion 4-250 of the operating unit 204 illustrated in FIG. 4.

FIG. 6A is an application mode screen that the CPU 205 controls the display portion 4-250 to display in response to the operator pressing the key 4-260 on the operating screen illustrated in FIG. 4.

A key 601 on the screen in FIG. 6A is a key for setting a bookbinding mode (case binding or saddle stitching). Upon the operator pressing the key 601, the CPU 205 controls the display portion 4-250 to display the manuscript size selection screen illustrated in FIG. 6B.

FIG. 6B is an operating screen for specifying the size of originals employed for print processing of the sheets S serving as the body of the book S3 to be subjected to bookbinding in the bookbinding mode. A key group 602 on the screen in FIG. 6B is original size specification keys for the operator setting the size of original sheets serving as the body. For example, upon the operator pressing "A4" size on the screen in FIG. 6B, and then pressing "Next" key, the CPU 205 displays the operating screen illustrated in FIG. 6C on the liquid crystal display portion 4-250.

FIG. 6C is a screen for setting the type of bookbinding. Pressing a case binding key 603 on the screen in FIG. 6C allows the operator to specify case binding processing. On the other hand, pressing a saddle stitching key 604 on the setting screen in FIG. 6C allows the operator to specify saddle stitching processing. Upon the operator pressing the bookbinding key 603 to specify case binding processing, the CPU 205 controls the liquid crystal display portion 4-250 to display the screen illustrated in FIG. 7A.

Figure 7A:
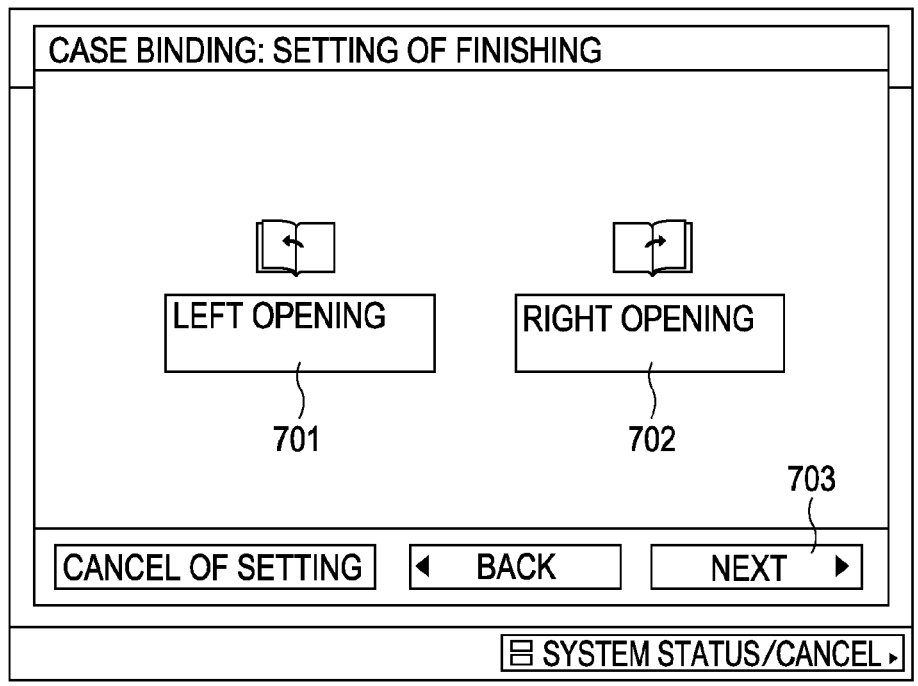
FIGS. 7A through 7D are diagrams illustrating one example of an operating screen displayed on the liquid crystal display unit illustrated in FIG. 4.

FIG. 7A is a screen for specifying whether to create the book S3 as a left-opening book or a right-opening book. Upon the operator pressing a left-opening key 701, and then pressing a key 703, the CPU 205 specifies the left-opening bookbinding mode as a bookbinding mode. On the other hand, upon the operator pressing a right-opening key 702, and then pressing the key 703, the CPU 205 specifies the right-opening bookbinding mode as a bookbinding mode. Upon the operator pressing the key 703, the CPU 205 controls the liquid crystal display portion 4-250 to display the screen illustrated in FIG. 7B.

Figure 7B:
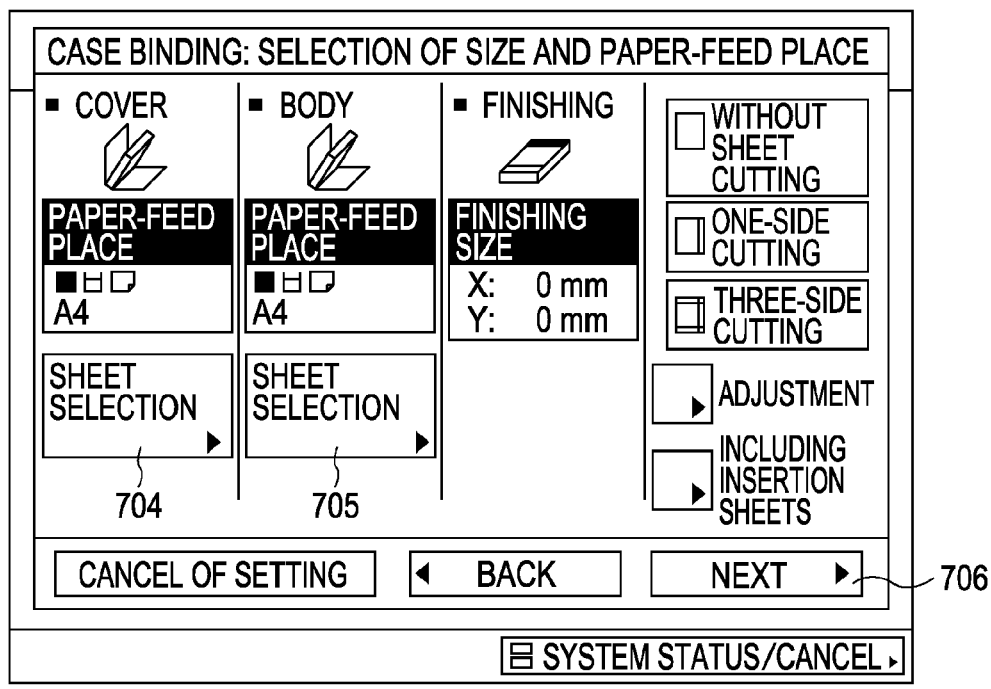

FIG. 7B is a screen for specifying the sheet size of the cover sheet S2 employed for a cover for creating the book S3, and the paper feed place of the cover sheets S2. With the present embodiment, let us say that the cover sheets S2 are loaded in the cover sheet loading tray 70, so following pressing a sheet selection key 704, the operator specifying the cover sheet loading tray 70 on a screen (not shown) displayed on the liquid crystal display portion 4-250. Also, FIG. 7B is a screen for specifying the sheet size of the sheets S employed for the body for creating the book S3, and the paper feed place of the sheets S. Upon the operator pressing the sheet selection key 705, the CPU 205 displays the screen illustrated in FIG. 5A, and has the operator specify which cassette of the cassettes 311 through 315 the sheets S are fed from. Subsequently, upon the operator pressing a key 706 following the cover sheet S2 and the sheets S being selected through the sheet selection keys 704 and 705, the CPU 205 determines the settings regarding the cover sheet S2 and sheets S. Subsequently, the CPU 205 controls the liquid crystal display portion 4-250 to display the screen illustrated in FIG. 7C.

Figure 7C:

FIG. 7C is a screen for performing settings for scanning original sheets employed for print processing of the sheet bundle S1 serving as the body of the book S3 by the scanner unit 201. A key 707 is for setting the size of original sheets employed for print processing of the sheet bundle S1. Upon the operator pressing the key 707, the CPU 205 displays the screen in FIG. 6B, and has the operator specify the size of original sheets. Subsequently, upon the operator specifying the size of originals, the CPU 205 determines the size of originals. Also, reference numeral 708 denotes a key for specifying whether or not the originals employed for print processing of the sheet bundle S1 are original sheets of which both sides are subjected to print processing. In the event of the operator pressing the key 708, the scanner unit 201 scans both sides of originals as image data, and obtains image data of two page worth from one original sheet. Subsequently, upon the operator pressing a key 709, the CPU 205 controls the liquid crystal display portion 4-250 to display the screen illustrated in FIG. 7D.

Figure 7D:

FIG. 7D is a screen for setting whether or not the sheet bundle S1 serving as the body of the book S3 is created by subjecting both sides of the sheets S to print processing using a refeeding conveyance channel 332. In the event of the operator pressing a key 710, the CPU 205 controls the printer unit 203 so as to subject only one side of the sheets S to print processing. In the event of the operator pressing a key 711, the CPU 205 controls the printer unit 203 to subject both sides of the sheets S to print processing. In the event of the operator pressing a key 712, the CPU 205 determines that setting regarding case binding processing has been completed, and controls the liquid crystal display portion 4-250 to display the screen in FIG. 6A.

<Bookbinding Setting Procedures: Second Input Method>

Next, bookbinding setting procedures will be described with reference to FIG. 9.

With the above bookbinding setting procedures, as for a method for inputting image data of multiple pages employed for print processing of the sheets S, the method employing image data input from the scanner unit 201 has been described. Hereinafter, as for a method for inputting image data of multiple pages employed for print processing of the sheets S, a method employing image data input to the hard disk 209 beforehand will be described.

FIG. 9A is a screen that is displayed when the operator pressing the key 2203 displayed on the liquid crystal display portion 4-250 in FIG. 4.

Now, the term "box" indicates a storage region on the hard disk 209, and an individual storage region corresponding to each of the multiple operators using the printing device 105 is allocated. With the example in FIG. 9, a box number "03" is allocated to an operator "hasegawa". Upon the operator selecting the box number "03" allocated to "hasegawa", the CPU 205 displays the screen in FIG. 9B. FIG. 9B is a list indicating print jobs stored in the storage region within the hard disk 209 corresponding to the box number "03". With the example in FIG. 9B, six print jobs are stored. The print jobs may be print jobs received from an external device via the external interface 202, or may be image data of multiple pages input via the scanner unit 201.

Figure 9C:
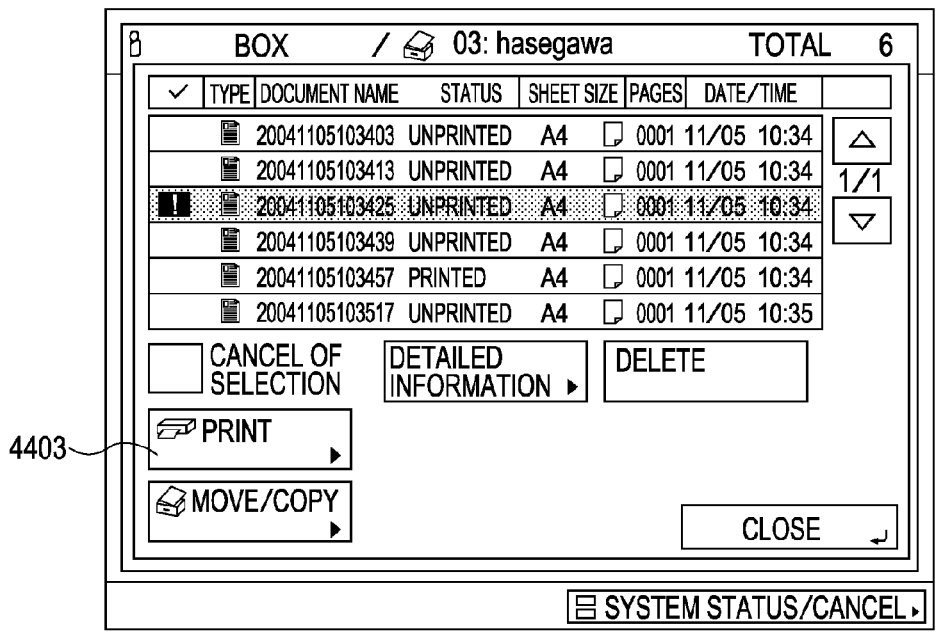
Figure 9D:
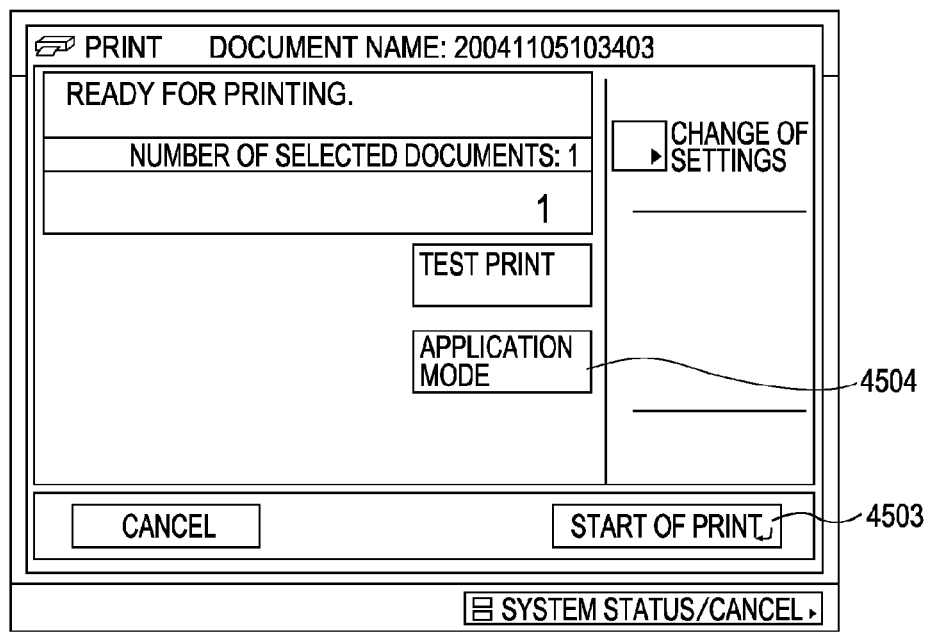
Figure 10A:
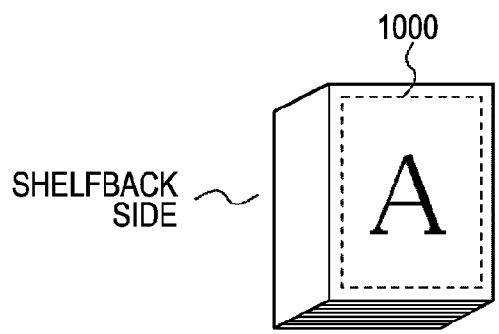
FIGS. 10A through 10D are diagrams illustrating the configuration of a left-opening book.
Figure 10B:
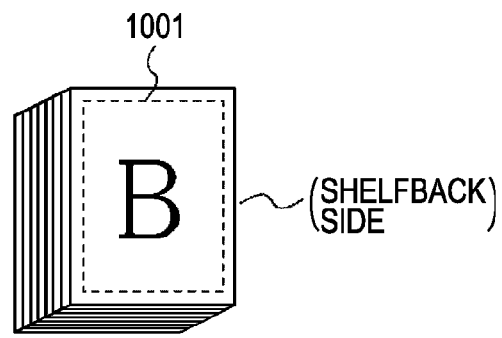
Figure 10C:
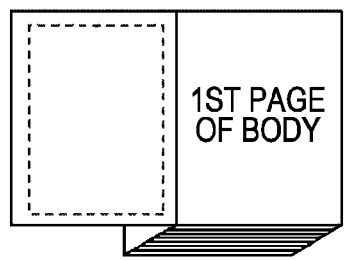
Figure 10D:
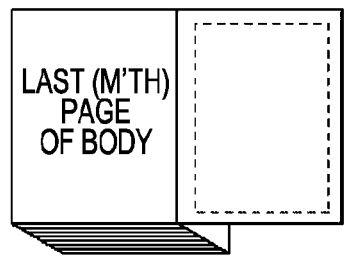
Figure 11:
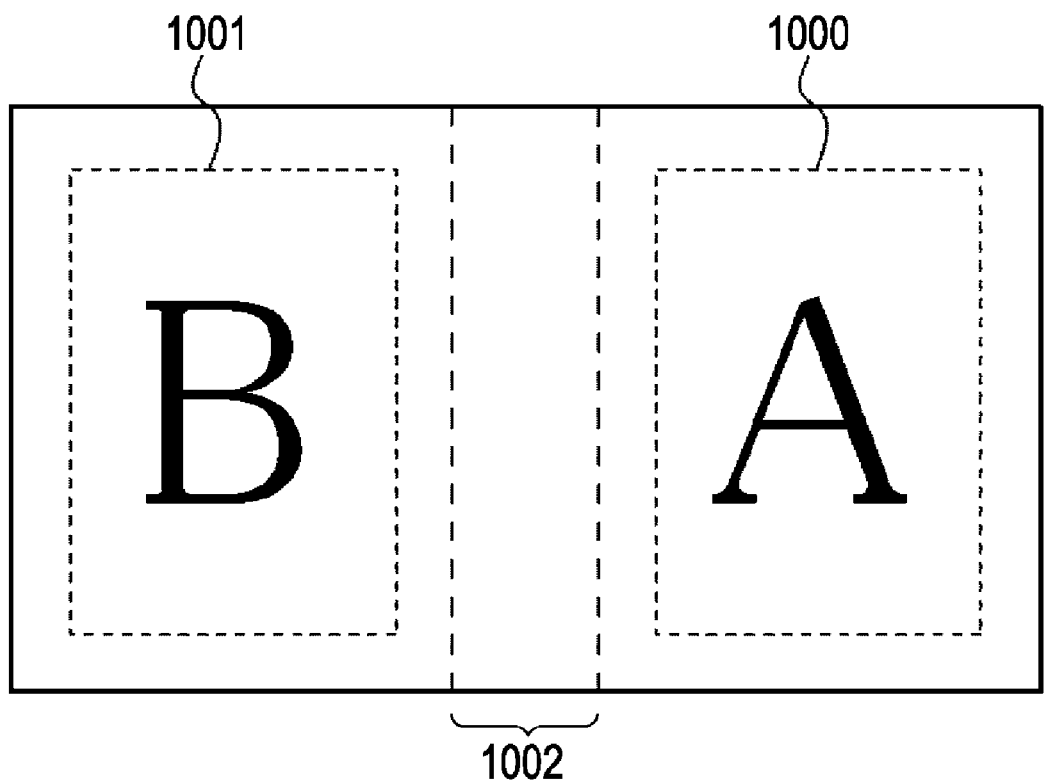
FIG. 11 is a diagram illustrating the configuration of a cover sheet for creating a left-opening book.
Figure 12A:
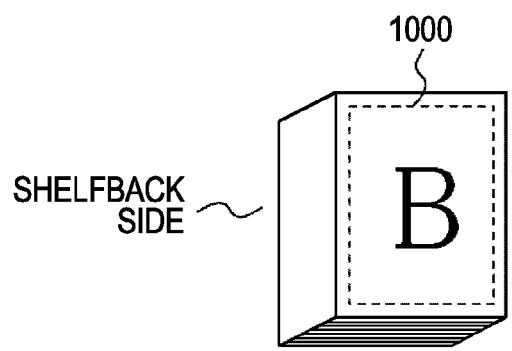
FIGS. 12A through 12D are diagrams illustrating the configuration of a right-opening book.
Figure 12B:
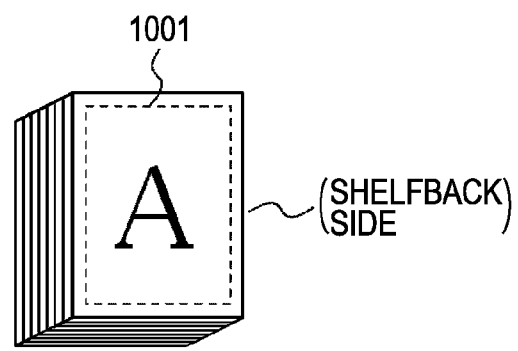
Figure 12C:
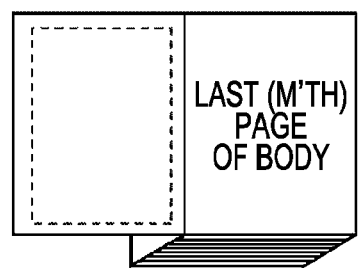
Figure 12D:
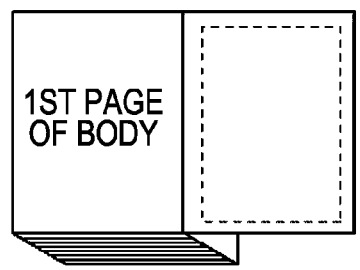
Figure 13:
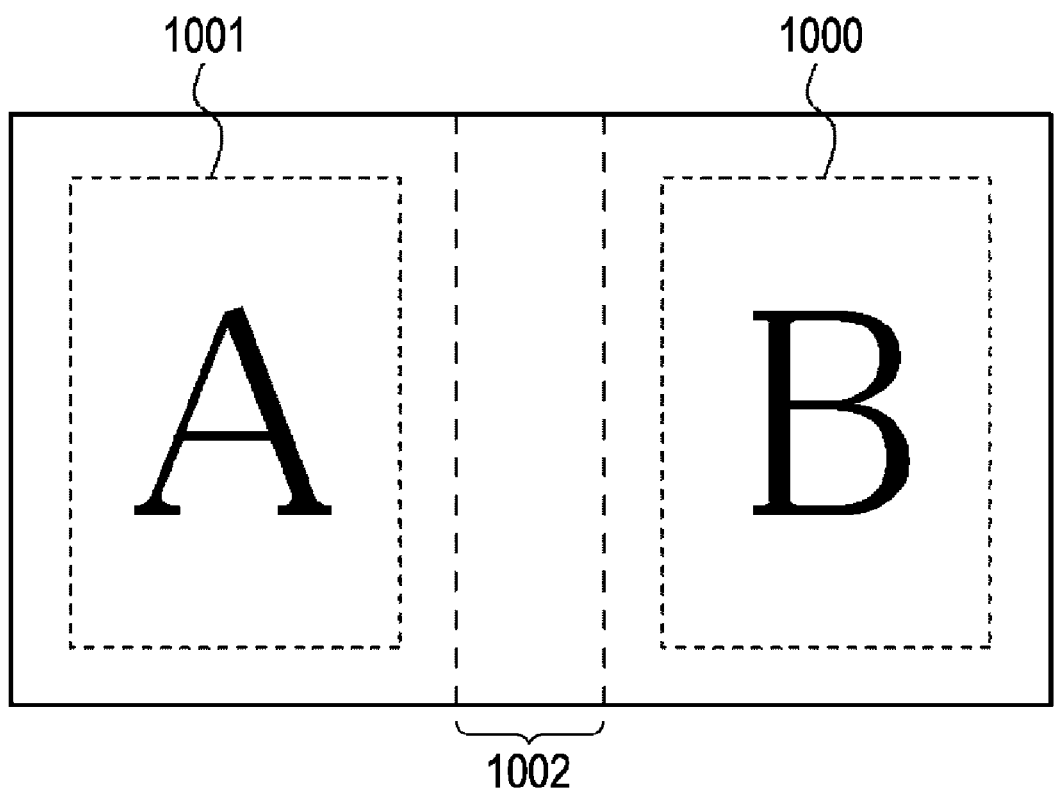
FIG. 13 is a diagram illustrating the configuration of a cover sheet for creating a right-opening book.

Subsequently, of the multiple print jobs list-displayed in FIG. 9B, upon the operator selecting the print job of which document name is "list.doc", the CPU 205 displays the screen in FIG. 9C. In FIG. 9C, the CPU 205 newly displays a print key 4403 by the operator selecting the print job. Subsequently, in the event of executing print processing using the print job of which document name is "list.doc", the operator presses the print key 4403. The CPU 205 displays the screen in FIG. 9D by the operator pressing the print key 4403. Upon the CPU 205 determining that the operator has pressed the print key 4503 in a state of displaying the screen FIG. 9D, the CPU 205 starts execution of the print job of which document name is "list.doc". On the other hand, in the event of executing bookbinding processing using the print job of which document name is "list.doc", the operator presses an application mode key 4504. In the event of the operator pressing the application mode key 4504, the CPU 205 displays the screen in FIG. 6A.

Note that the operation that the CPU 205 executes following displaying FIG. 6A is basically the same as the above "Bookbinding Setting Procedures: First Input Method". Accordingly, only the points different from the first method will be additionally described here.

With the "First Input Method", setting has been made using the keys 707 and 708 in FIG. 7C. The reason why this setting has been made is for performing print processing using the image data input from the scanner unit 201. On the other hand, with the "Second Input Method", print processing is performed using the print job that the operator selected in FIG. 9B, so there is no need to perform the setting in FIG. 7C.

<Bookbinding Processing Execution Procedures: Simplex Printing>

Figure 14:
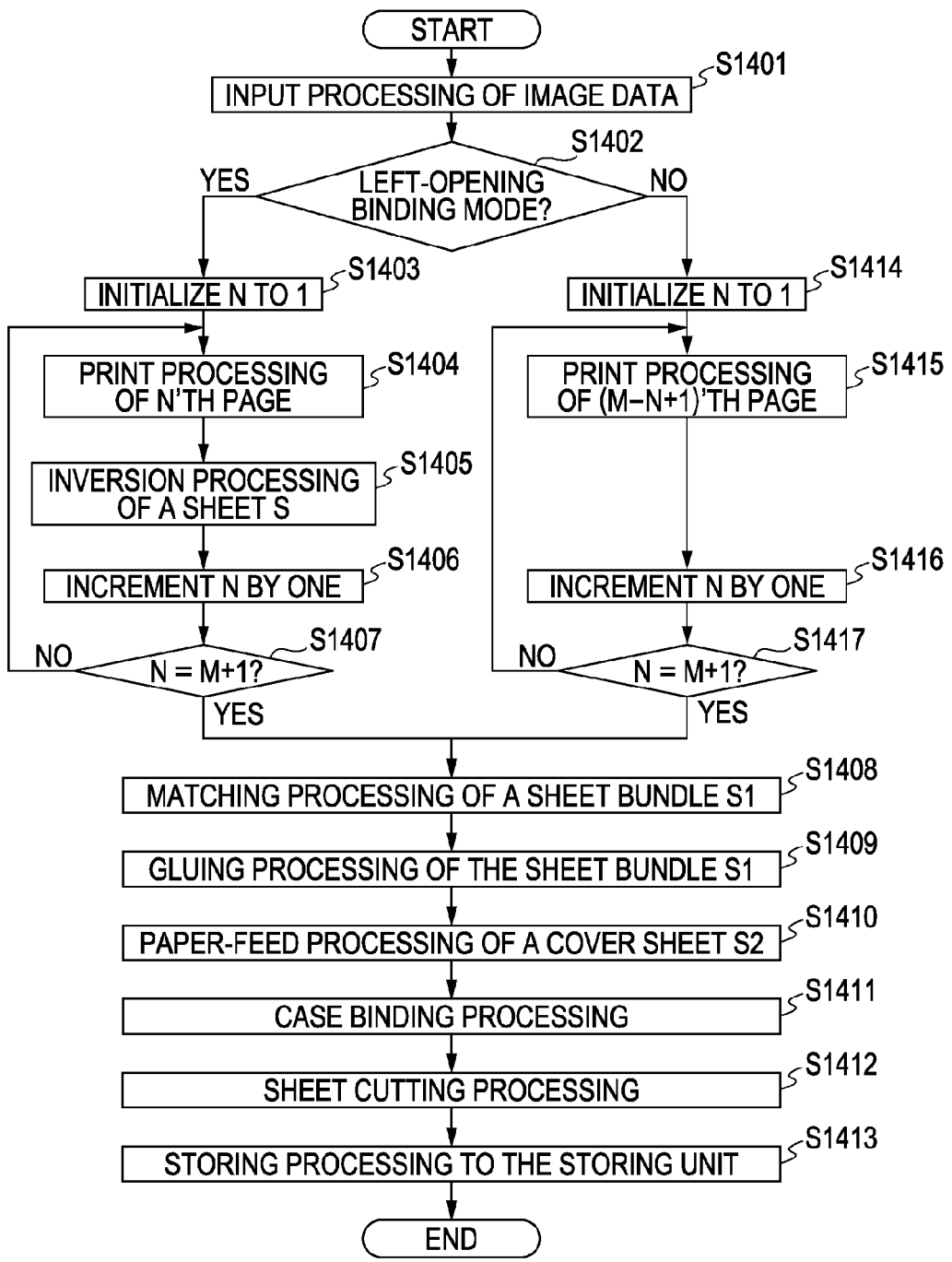
FIG. 14 is a flowchart of bookbinding processing when simplex printing is selected according to a first embodiment.

Next, the bookbinding processing flow according to the first embodiment will be described with reference to FIG. 14. Description will be made here regarding the case binding processing that is executed in the event of the operator selecting the case binding key 603 on the screen in FIG. 6C. Also, FIG. 14 illustrates the operations in the event of the operator setting for the single sides of the sheets S to be subjected to print processing in FIG. 7D.

In step S1401, the CPU 205 executes input processing of image data of multiple pages. The input processing can be executed using one of the above two input methods. In the event of employing the first method for inputting image data from the scanner unit 201, the scanner unit 201 scans the image on the originals loaded in the document feeder unit 250 by the operator pressing the start key 4-241, whereby image data of multiple pages is input, and output to the printer unit 203. On the other hand, in the event of the second method employing image data input to the hard disk 209 beforehand, the print job stored in the hard disk 209 is read out by the operator pressing the start key 4-241. Subsequently, the memory controller unit 206 outputs the print job read out to the printer unit 203, whereby image data of multiple pages is input.

In step S1402, the CPU 205 determines whether the bookbinding mode that the operator has set in FIG. 7C is the right-opening bookbinding mode or left-opening bookbinding mode. In the event of the left-opening bookbinding mode, the CPU 205 proceeds to step S1403, but in the event of the right-opening bookbinding mode, the CPU 205 proceeds to step S1414.

Note that the following steps S1403 through S1407 are the flow for subjecting the print job made up of image data of M pages to print processing in the sequence of the 1st page, 2nd page, and so on through M−1'th page, and M'th page. On the other hand, steps S1414 through S1417 are the flow for subjecting the print job made up of image data of M pages to print processing in the print sequence of the M'th page, M−1'th page, and so on through 2nd page, and 1st page, which is the inverted sequence of the steps S1403 through S1407.

In step S1403, the CPU 205 sets page identification information N for controlling the print sequence of image data of multiple pages to "1", which is an initial value. Note that this page identification information N is information that is stored in the RAM 208, and the CPU 205 can read out and write.

The CPU 205, in step S1404, controls the printer unit 203 to execute the print processing of the N'th page, and in step S1405 subjects the sheet S to inversion processing, and then conveys the sheet S to the stacker device 104. Note that the reason why the sheet S is subjected to inversion processing is for stacking the sheet S in a state in which the upper side of the sheet S is subjected to print processing (faced up state) in the stacking tray 42 in a state in which the lower side of the sheet S is subjected to print processing (faced down state). Here, the CPU 205 controls a conveyance unit (not shown) within the stacker device 104 to convey the sheet S to the case binding device 103. Also, the CPU 205 controls the case binding device 103 to convey the sheet S conveyed from the stacker device 104 to the stacking tray 42.

The CPU 205, in step S1406, adds one to the page identification information N, and proceeds to step S1407. In step S1407, the CPU 205 determines whether or not the page identification information N reaches M+1, and in the event that the N is equal to M+1, the CPU 205 proceeds to step S1408, and otherwise returns to step S1404. Here, the M is the total number of pages of the print job, e.g., in the event of a print job made up of image data of 10 pages, 10 is set to the M. Note that with the above second method, the print job is stored in the hard disk 209 beforehand, and the total number of pages is determined, so the number of pages thereof is set to the M. On the other hand, with the first method, the number of originals that the document unit 205 reads is not known beforehand. Therefore, the CPU 205 detects in step S1407 whether or not there is an original to be scanned subsequently by a document detection sensor (not shown) or the like which is provided in the document unit 205, thereby performing determination in step S1407. Specifically, in the event of determining that there is no original to be scanned subsequently, the CPU 205 proceeds to step S1408, and otherwise returns to step S1404.

Figure 16:
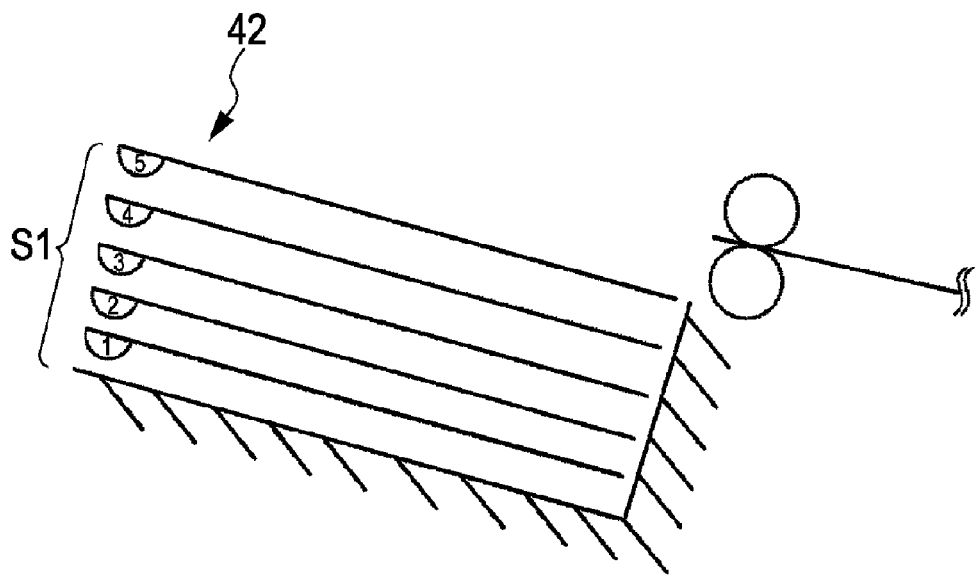
FIG. 16 is a diagram schematically illustrating a sheet bundle S1 in a right-opening bookbinding mode when simplex printing is selected according to a first embodiment.

The CPU 205 repeats the above steps S1404 through S1407, thereby stacking the multiple sheets S in the stacking tray 42 to generate a sheet bundle S1. FIG. 16 schematically illustrates the sheet bundle S1 stacked in the stacking tray 42 in this case when the simplex printing and the right-opening bookbinding mode have been selected. The numerals in FIG. 16 schematically illustrate page numbers, but actually, the image of the page corresponding to a number is printed on the lower side of the corresponding sheet. FIG. 16 corresponds to the case of executing a print job made up of image data of five pages, and the sheets S are stacked in the stacking tray 42 in a faced down state (state in which the side subjected to print processing is oriented downward). Note that with the print sequence in this case, the first page is the top page, and the fifth page is the last page.

Next, description will be made regarding steps to be executed in the case of the CPU 205 determining that the bookbinding mode is the right-opening bookbinding mode in step S1402.

In step S1414, the CPU 205 sets page identification information N for controlling the print sequence of image data of multiple pages to "1", which is an initial value.

The CPU 205 controls the printer unit 203 to execute the print processing of the (M−N+1)'th page in step S1415. The reason why the (M−N+1)'th page is employed here is for subjecting from the M'th page, which is the last page, to print processing in the event of printing a print job of M pages. In the right-opening bookbinding mode, the sheet S is not subjected to inverse processing, which is different from the left-opening bookbinding mode. This is because it is desirable to stack the sheet S subjected to print processing in the stacking tray 42 with the upper side being faced up (in a state in which the side subjected to print processing is faced up). Here, the CPU 205 controls a conveyance unit (not shown) within the stacker device 104 to convey the sheet S to the case binding device 103. Also, the CPU 205 controls the case binding device 103 to convey the sheet S conveyed from the stacker device 104 to the stacking tray 42.

The CPU 205, in step S1416, adds one to the page identification information N, and proceeds to step S1417. In step S1417, the CPU 205 determines whether or not the page identification information N reaches M+1, and in the event that the N is equal to M+1, the CPU 205 proceeds to step S1408, and otherwise returns to step S1415. Specifically, in the event of determining that there is no original to be scanned subsequently, the CPU 205 proceeds to step S1408, and otherwise returns to step S1415.

Figure 17:
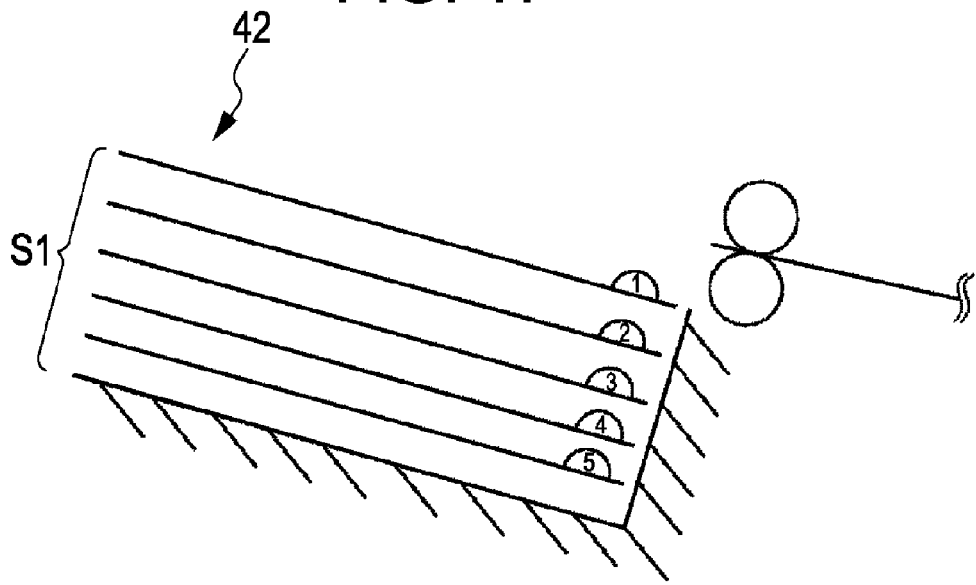
FIG. 17 is a diagram schematically illustrating the sheet bundle S1 in a left-opening bookbinding mode when simplex printing is selected according to a first embodiment.

The CPU 205 repeats the above steps S1415 through S1417, thereby stacking the multiple sheets S in the stacking tray 42 to generate the sheet bundle S1. FIG. 17 schematically illustrates the sheet bundle S1 stacked in the stacking tray 42 in this case when the simplex printing and the left-opening bookbinding mode have been selected. The numerals in FIG. 17 schematically illustrate page numbers, but actually, the image of the page corresponding to a number is printed on the upper side of the corresponding sheet. FIG. 17 corresponds to the case of executing a print job made up of image data of five pages, and the sheets S are stacked in the stacking tray 42 in a faced up state. Note that with the print sequence in this case, the fifth page is the top page, and the first page is the last page.

Description will be made below regarding bookbinding processing using the sheet bundle S1 generated in the stacking tray 42 in the above steps S1404 through S1417 and S1414 through S1417. Note that specific operations employing the case binding processing 103 are the same as described with FIG. 8.

The CPU 205 subjects the sheet bundle S1 to matching processing in step S1408, and subjects one end of the sheet bundle S to gluing processing in step S1409, thereby matching the sheet bundle S and the cover sheet S2. On the other hand, the CPU 205 feeds the cover sheet S2 loaded in the cover sheet loading tray. In FIG. 14, an arrangement has been made wherein the cover sheet S2 is fed (S1410) following the gluing processing (S1409), but the cover sheet S2 may be fed prior to the gluing processing beforehand.

The CPU 205 glues between one end of the sheet bundle S1 and the spine portion of the cover sheet S2 (reverse side portion of the spine cover region 1002), thereby executing bookbinding processing. Subsequently, the CPU 205 subjects the sheet bundle S1 to which the cover sheet S2 is adhered to sheet cutting processing in step S1412, and stores the sheet bundle S1 in the storing unit 34 in step S1413.

<Bookbinding Processing Execution Procedures: Duplex Printing>

Next, the bookbinding processing flow according to the first embodiment will be described with reference to FIG. 15. Description will be made here regarding the case binding processing that is executed in the event of the operator selecting the case binding key 603 on the screen in FIG. 6C. Also, FIG. 15 illustrates the operations in the event of the operator setting for both sides of the sheets S to be subjected to print processing in FIG. 7D.

Figure 15:
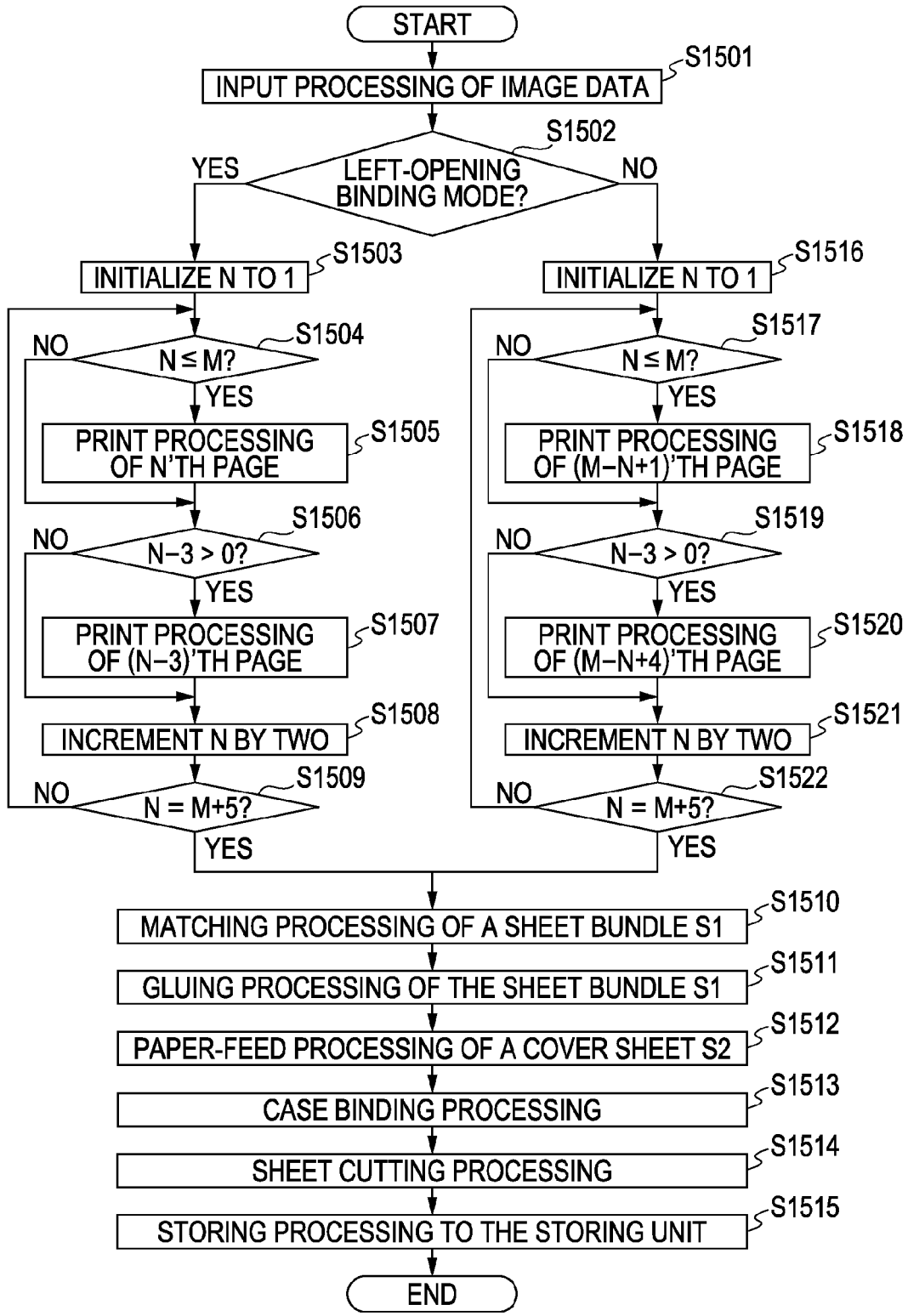
FIG. 15 is a flowchart of bookbinding processing when duplex printing is selected according to a first embodiment.

Note that steps S1501 and S1502 in FIG. 15 are the same as steps S1401 and S1402 in FIG. 14, so description thereof will be omitted. Also, steps S1510 through S1515 in FIG. 15 are the same as steps S1408 through S1413 in FIG. 14, so description thereof will be omitted.

Also, the following steps S1503 through S1509 are the flow for subjecting the print job made up of image data of M pages to print processing in the sequence of the 1st page, and so on through M'th page. On the other hand, steps S1516 through S1522 are the flow for subjecting the print job made up of image data of M pages to print processing in the print sequence of the M'th page, and so on through 1st page, which is the inverted sequence of the steps S1503 through S1509. Note that in FIG. 15, both sides of the sheet S are subjected to print processing, and accordingly, which is different from the method for sequentially subjecting pages to print processing one by one, such as the first page, second page, third page, and so on.

In step S1503, the CPU 205 sets the page identification information N to "1", which is an initial value.

In step S1504, the CPU 205 determines whether or not the page identification information N reaches M+1, and in the event that the page identification information N is not greater than M, the CPU 205 proceeds to step S1505, and otherwise returns to step S1506.

In step S1505, the CPU 205 feeds the sheet S from the selected cassette in response to the operator pressing the key 705 in FIG. 7B, and subjects the sheet S thereof to the print processing of the N'th page.

The CPU 205 determines in step S1506 whether or not N−3 is greater than 0, and in the event of greater than 0, proceeds to step S1507, and otherwise proceeds to step S1508. In step S1507, the CPU 205 subjects the sheet S conveyed from the refeeding conveyance channel 332 to the print processing of the (N−3)'th page. Here, "3" indicates the number of sheets that the printing device 105 can hold therein. When performing duplex printing, the printing device 105 feeds three sheets from the selected cassette consecutively to execute print processing. Subsequently, the printing device 105 alternately repeats the print processing as to the sheet S conveyed from the refeeding conveyance channel 332, and the print processing of odd pages as to the sheet S fed from the selected cassette. The printing device 105 prints both sides of the sheet S by this repeat print processing.

In step S1508, the CPU 205 adds 2 to the N, and proceeds to step S1509. In step S1509, the CPU 205 determines whether or not the page identification information N reaches M+5, and in the event that the N is equal to M+5, the CPU 205 proceeds to step S1510, and otherwise returns to step S1504.

Now, description will be made regarding the print sequence in the print processing that the CPU 205 controls the printer unit 203 to execute in steps S1503 through S1509, assuming that the print job is made up of image data of 10 pages. Note that description will be made assuming that the cassette 311 is selected in FIG. 7B.

First of all, the CPU 205 feeds three sheets S from the cassette 311, and subjects each of the sheets S to the print processing of image data of the first, third, and fifth pages. Also, the CPU 205 conveys the sheets S on which the first, third, and fifth pages are subjected to print processing to the refeeding conveyance channel 332. Note that the sheets S conveyed from the refeeding conveyance channel 332 are conveyed to the transfer unit 325 with the printed side being faced down.

Next, the CPU 205 conveys the sheet S on which the first page is subjected to print processing to the transfer unit 325, and executes the print processing of image data of the second page. Subsequently, the CPU 205 conveys the sheet S on which both of the image data of the first page and the image data of the second page are subjected to print processing to the stacker device 104. Subsequently, the CPU 205 subjects the sheet S fed from the cassette 311 to the print processing of image data of the seventh page. Subsequently, the CPU 205 conveys the sheet S on which the third page is subjected to print processing to the transfer unit 325, and executes the print processing of image data of the fourth page. Next, the CPU 205 subjects the sheet S fed from the cassette 311 to the print processing of image data of the ninth page. Subsequently, the CPU 205 conveys the sheets on which the fifth, seventh, and ninth pages are subjected to print processing from the refeeding conveyance channel 332 to the transfer unit 325. The CPU 205 then subjects those sheets S to the print processing of image data of the sixth, eighth, and tenth pages.

Figure 18:
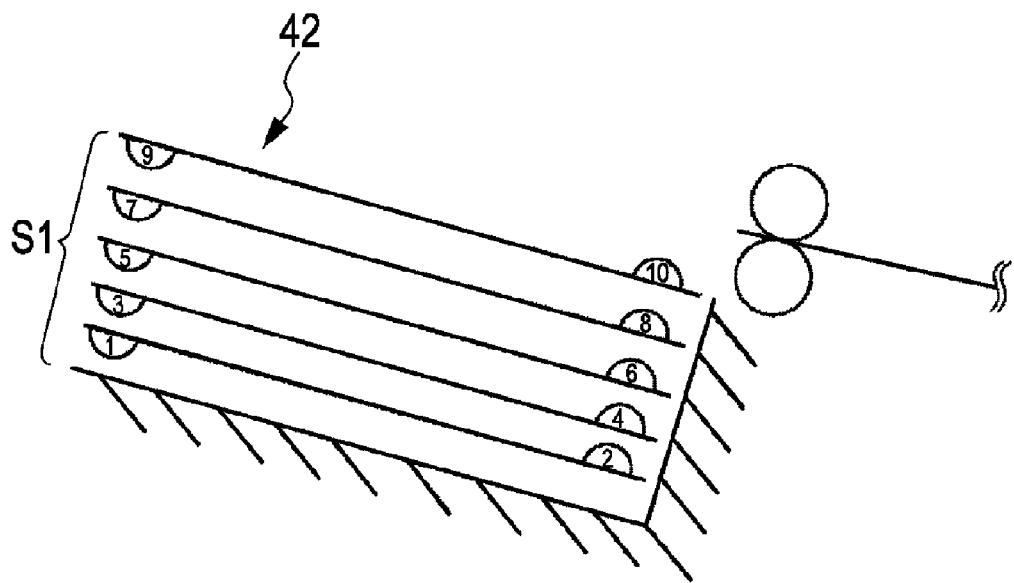
FIG. 18 is a diagram schematically illustrating the sheet bundle S1 in the right-opening bookbinding mode when duplex printing is selected according to a first embodiment.

As described above, the print sequence of image data of multiple pages becomes the sequence of 1-3-5-2-7-4-9-6-8-10. FIG. 18 schematically illustrates the sheet bundle S1 stacked in the stacking tray 42 in this case when the duplex printing and the right-opening bookbinding mode have been selected. The numerals in FIG. 18 schematically indicate page numbers, and actually, the images of the pages corresponding to the odd pages are subjected to print processing at the lower sides of the sheets, and the images of the pages corresponding to the even pages are subjected to print processing at the upper sides of the sheets.

Next, description will be made regarding steps to be executed in the case of the CPU 205 determining that the bookbinding mode is the right-opening bookbinding mode in step S1502.

In step S1516, the CPU 205 sets the page identification information N to "1", which is an initial value.

In step S1517, the CPU 205 determines whether or not the page identification information N is not greater than M, and in the event that the N is not greater than M, the CPU 205 proceeds to step S1518, and otherwise returns to step S1519.

In step S1518, the CPU 205 feeds the sheet S from the selected cassette in response to the operator pressing the key 705 in FIG. 7B, and subjects the sheet S thereof to the print processing of the (M−N+1)'th page.

The CPU 205 determines in step S1519 whether or not N−3 is greater than 0, and in the event of greater than 0, proceeds to step S1520, and otherwise proceeds to step S1521. In step S1520, the CPU 205 subjects the sheet S conveyed from the refeeding conveyance channel 332 to the print processing of the (M−N+4)'th page. Subsequently, the printing device 105 alternately repeats the print processing as to the sheet S conveyed from the refeeding conveyance channel 332, and the print processing as to the sheet S fed from the selected cassette. The printing device 105 prints both sides of the sheet S by this repeat print processing.

In step S1521, the CPU 205 adds 2 to the N, and proceeds to step S1522. The CPU 205 determines in step S1522 whether or not the page identification information N reaches M+5, and in the event that the N is equal to M+5, the CPU 205 proceeds to step S1510, and otherwise returns to step S1517.

Now, description will be made regarding the print sequence in the print processing that the CPU 205 controls the printer unit 203 to execute in steps S1516 through S1522, assuming that the print job is made up of image data of 10 pages. Note that description will be made assuming that the cassette 311 is selected in FIG. 7B.

First of all, the CPU 205 feeds three sheets S from the cassette 311, and subjects each of the sheets S to the print processing of image data of the tenth, eighth, and sixth pages. Also, the CPU 205 conveys the sheets S on which the tenth, eighth, and sixth pages are subjected to print processing to the refeeding conveyance channel 332.

Next, the CPU 205 conveys the sheet S on which the tenth page is subjected to print processing to the transfer unit 325, and executes the print processing of image data of the ninth page. Subsequently, the CPU 205 conveys the sheet S on which both of the image data of the tenth page and the image data of the ninth page are subjected to print processing to the stacker device 104. Subsequently, the CPU 205 subjects the sheet S fed from the cassette 311 to the print processing of image data of the fourth page. The CPU 205 then conveys the sheet S on which the eighth page is subjected to print processing to the transfer unit 325, and executes the print processing of image data of the seventh page. Next, the CPU 205 subjects the sheet S fed from the cassette 311 to the print processing of image data of the second page. Subsequently, the CPU 205 conveys the sheet S on which the sixth, fourth, and second pages are subjected to print processing from the refeeding conveyance channel 332 to the transfer unit 325. The CPU 205 then subjects those sheets S to the print processing of image data of the fifth, third, and first pages.

Figure 19:
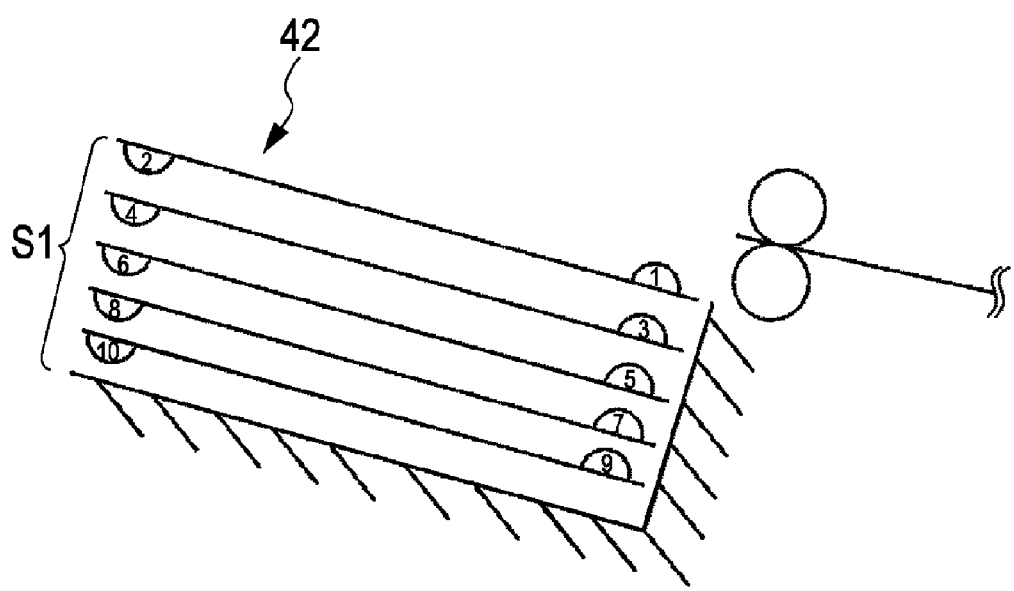
FIG. 19 is a diagram schematically illustrating the sheet bundle S1 in the left-opening bookbinding mode when duplex printing is selected according to a first embodiment.

As described above, the print sequence of image data of multiple pages becomes the sequence of 10-8-6-9-4-7-2-5-3-1. The print sequence in the right-opening bookbinding mode is the reverse print sequence in left-opening bookbinding. FIG. 19 schematically illustrates the sheet bundle S1 stacked in the stacking tray 42 in this case when the duplex printing and the left-opening bookbinding mode have been selected. The numerals in FIG. 19 schematically denote page numbers, and actually, the images of the pages corresponding to the even pages are subjected to print processing at the lower sides of the sheets, and the images of the pages corresponding to the odd pages are subjected to print processing at the upper sides of the sheets.

As described with FIG. 14 and FIG. 15, the CPU 205 controls the printer unit 203 such that the print sequence of image data of multiple pages becomes reverse sequence thereof depending a case wherein the bookbinding mode at the time of executing case binding processing is the right-opening bookbinding mode, and a case wherein the bookbinding mode at the time of executing case binding processing is the left-opening bookbinding mode. Now, description will be made regarding unique effects according to the present embodiment with reference to FIG. 20 and FIG. 21.

Figure 20:
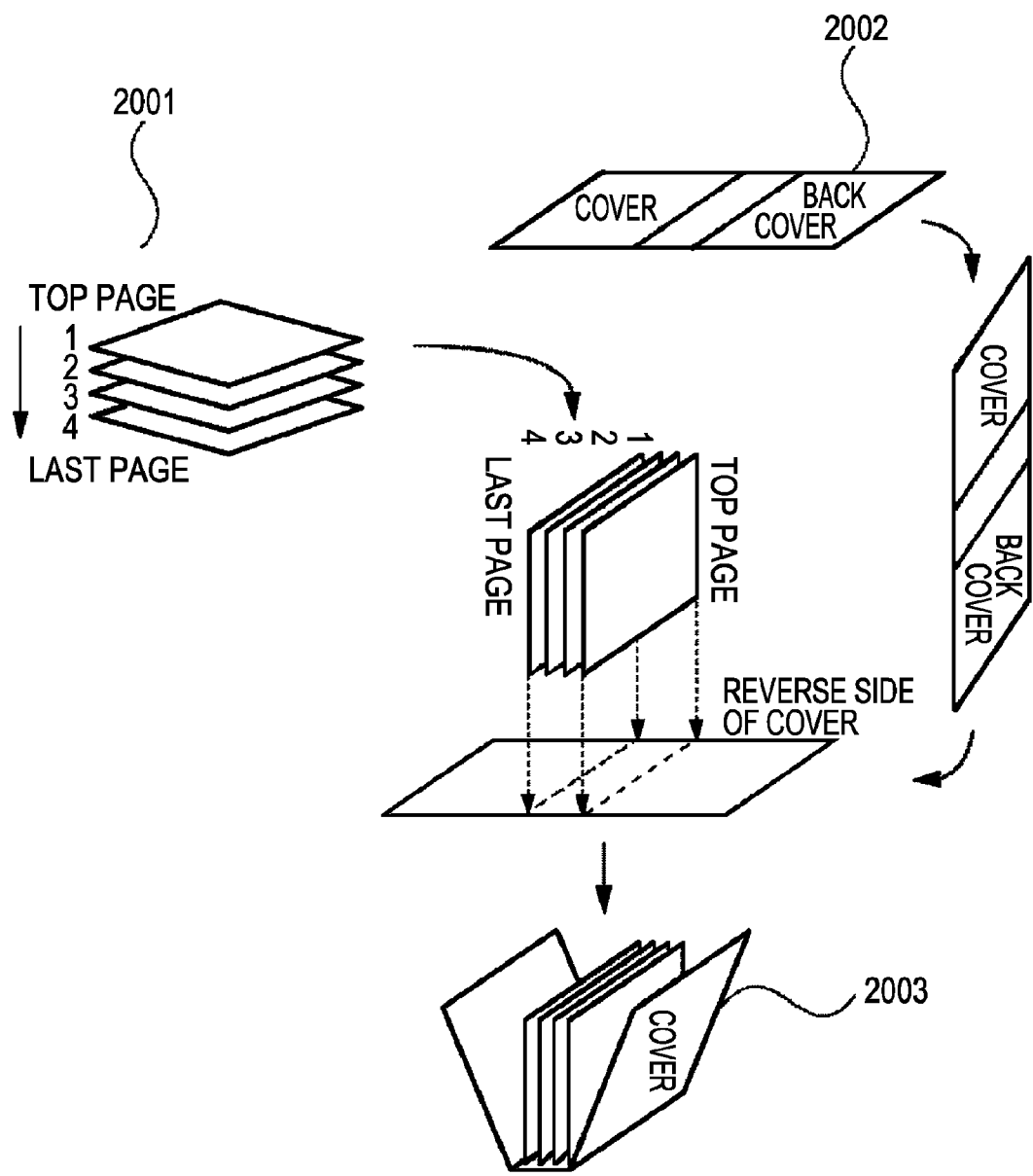
FIG. 20 is a diagram schematically illustrating a process of constructing a book in the right-opening bookbinding mode according to an embodiment.

FIG. 20 is a diagram schematically illustrating a process of constructing a book in the right-opening bookbinding mode according to an embodiment of the present invention. In FIG. 20, reference numeral 2001 denotes the sheet bundle S1 stacked in the stacking tray 42, and 2002 denotes the cover sheet S2 loaded in the cover sheet loading tray 70. Also, reference numeral 2003 denotes the book S3 created by gluing the cover sheet S2 to the sheet bundle S1.

Figure 21:
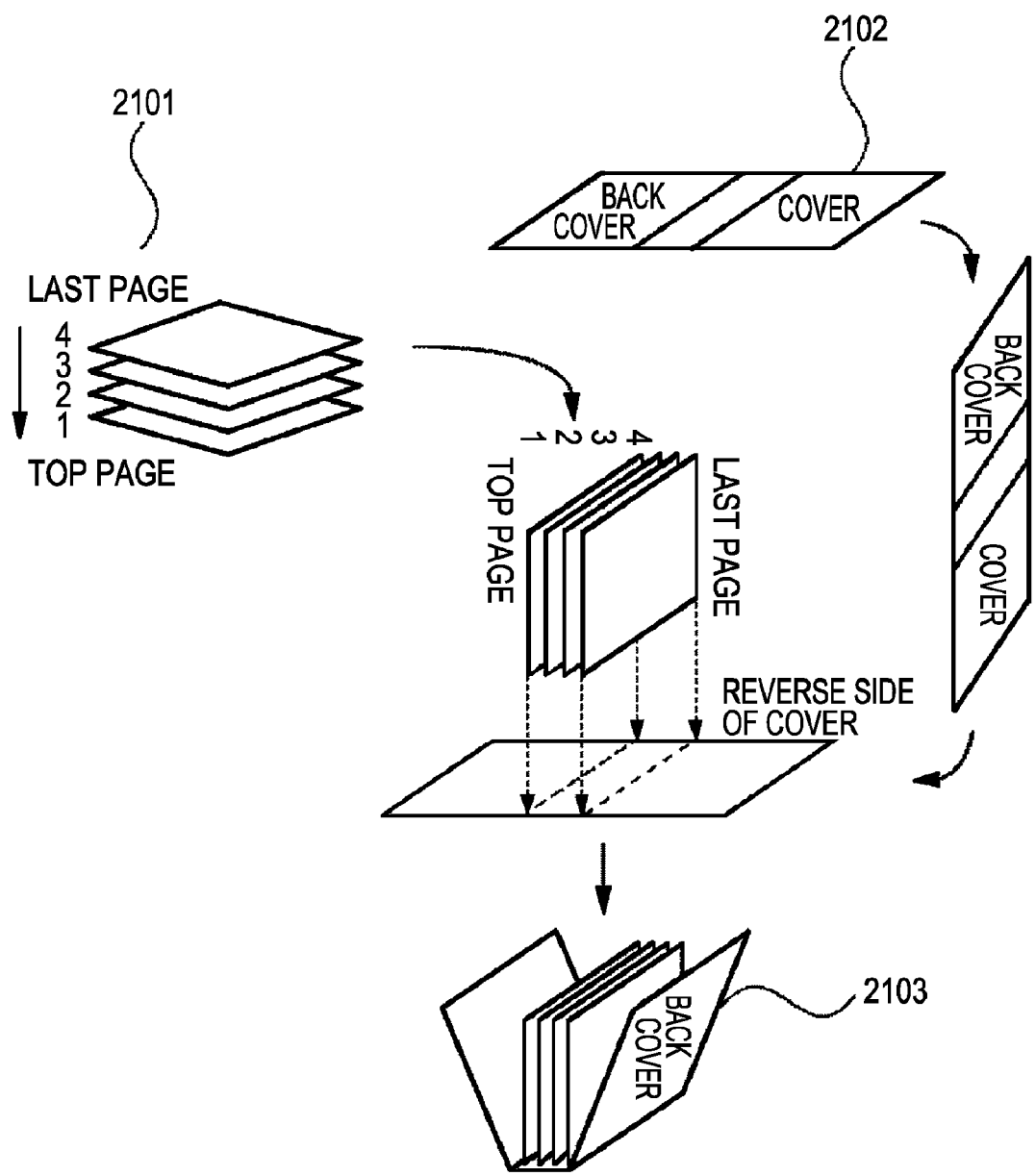
FIG. 21 is a diagram schematically illustrating a process of constructing a book in the left-opening bookbinding mode according to an embodiment.

FIG. 21 is a diagram schematically illustrating a process of constructing a book in the left-opening bookbinding mode according to an embodiment of the present invention. In FIG. 21, reference numeral 2101 denotes the sheet bundle S1 stacked in the stacking tray 42, and 2102 denotes the cover sheet S2 loaded in the cover sheet loading tray 70. Also, reference numeral 2103 denotes the book S3 created by gluing the cover sheet S2 to the sheet bundle S1.

In both of FIG. 20 and FIG. 21, the loading direction of the cover sheet S2 loaded in the cover sheet loading tray 70 is the same. That is to say, it is not necessary for the operator of the bookbinding system 2000 to change over the loading direction of the cover sheet depending on the case of the right-opening bookbinding mode and the case of the left-opening bookbinding mode. On the other hand, at 2001 the sheet S on which the top page is subjected to print processing is loaded in the uppermost side, but at 2101 the sheet S on which the top page is subjected to print processing is loaded in the lowermost side. With the book S3, the image data serving as the top page of the body is subjected to print processing on the sheet serving as the top page of the body not only in the case of the right-opening bookbinding mode but also in the case of left-opening bookbinding mode.

Therefore, according to the first embodiment, a book can be created appropriately in light of regarding whether to create a right-opening book or a left-opening book without causing deterioration in operability by having the operator of the bookbinding system 2000 change over the loading direction of cover sheets.

Second Exemplary Embodiment

Next, description will be made regarding a second embodiment of the present invention with the appended drawings.

With the first embodiment, the print sequence is controlled so as not to change over the loading direction of a cover sheet depending on the case of the right-opening bookbinding mode or the case of the left-opening bookbinding mode. The advantage of the first embodiment is an effect for preventing deterioration in operability by changing the loading direction of a cover sheet. However, the first embodiment has such an advantage, but also causes a problem to occur by inverting the print sequence depending on the case of the right-opening bookbinding mode or the left-opening bookbinding mode. For example, in the event of employing the first input method for inputting image data from the scanner unit 201, print processing is started from the last page in the right-opening bookbinding mode, which causes a problem wherein print processing cannot be started until the original of the last page is scanned as image data. In other words, the right-opening bookbinding mode includes a problem wherein productivity deteriorates as compared with the left-opening bookbinding mode wherein print processing can be started immediately following scanning the top page. Therefore, the second embodiment prevents deterioration in productivity due to changing the print sequence depending on the case of the right-opening bookbinding mode or the left-opening bookbinding mode.

Note that the second embodiment is the same as the first embodiment except in that the execution procedures of bookbinding processing differs. Hereinafter, description will be made regarding the execution procedures of bookbinding processing, and other descriptions will be omitted.

<Bookbinding Processing Execution Procedures: Simplex Printing>

Next, the bookbinding processing flow according to the second embodiment will be described with reference to FIG. 22. Description will be made here regarding the case binding processing that is executed in the event of the operator selecting the case binding key 603 on the screen in FIG. 6C. Also, FIG. 15 illustrates the operations in the event of the operator setting for single sides of the sheets S to be subjected to print processing in FIG. 7D.

Figure 22:
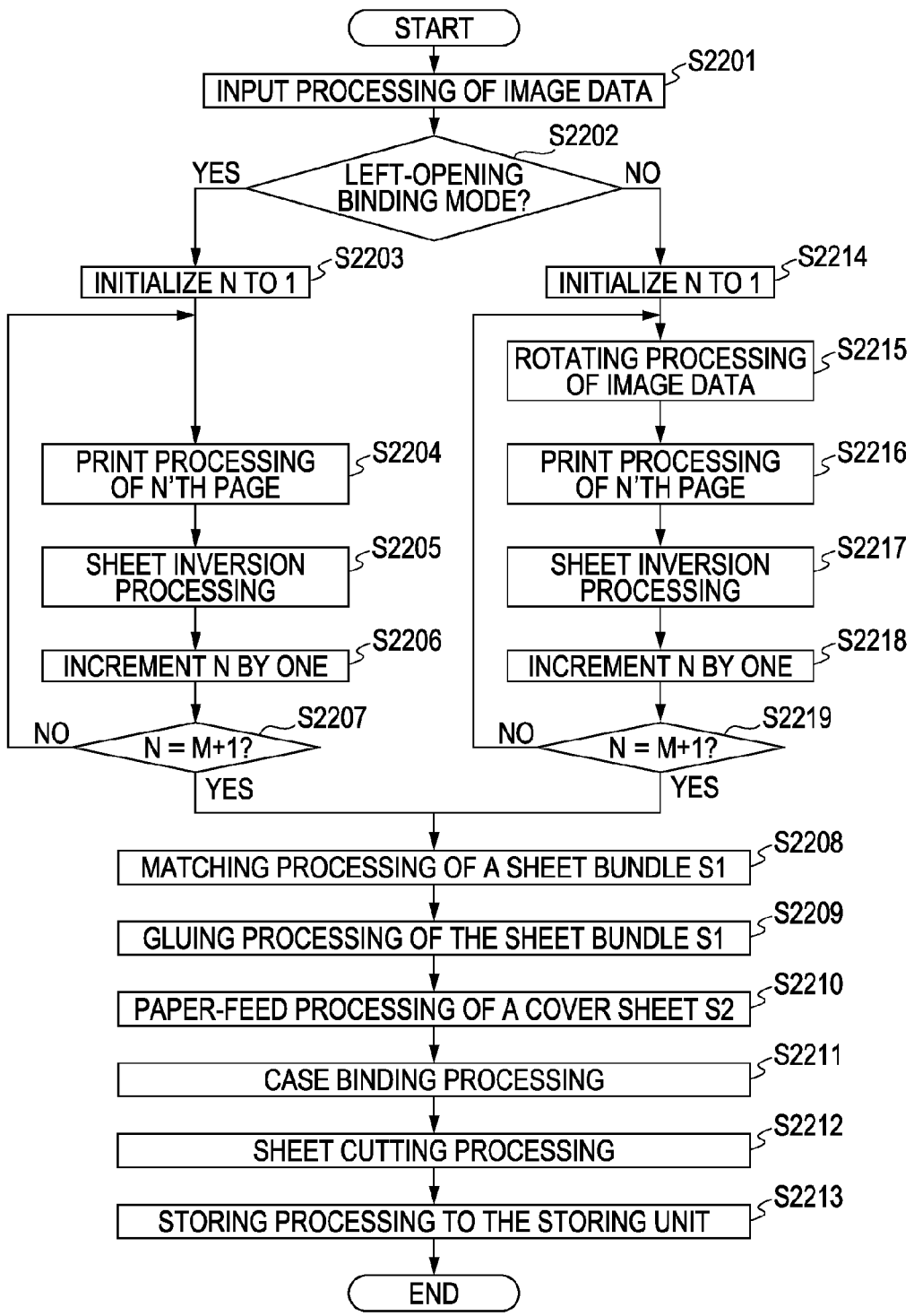
FIG. 22 is a flowchart of bookbinding processing when simplex printing is selected according to a second embodiment.

Note that steps S2201 through S2213 in FIG. 22 are the same as steps S1401 through S1413 in FIG. 14, so description thereof will be omitted. Also, steps S2214 through S2219 are the same as steps S2203 through S2207 except for step S2215.

In step S2215, the CPU 205 controls the rotating unit 231 to execute the rotating processing of image data of the N'th page. Note that the rotating unit 231 executes rotating processing such that the top-and-bottom directions of image data following rotating processing become the directions opposite of the top-and-bottom directions of image data prior to rotating processing. Also, a diagram schematically illustrating the sheet bundle S1 stacked in the stacking tray 42 is the same as FIG. 18. However, the top-and-bottom directions of image data on the sheets S differ between in the case of the left-opening bookbinding mode and in the case of the right-opening bookbinding mode. Specifically, the near-side direction of the bookbinding device 2000 is the bottom of image data in the left-opening bookbinding mode, and the near-side direction of the bookbinding device 2000 is the top of image data in the right-opening bookbinding mode.

<Bookbinding Processing Execution Procedures: Duplex Printing>

Next, the bookbinding processing flow according to the second embodiment will be described with reference to FIG. 23. Description will be made here regarding the case binding processing that is executed in the event of the operator selecting the case binding key 603 on the screen in FIG. 6C. Also, FIG. 15 illustrates the operations in the event of the operator setting for both sides of the sheets S to be subjected to print processing in FIG. 7D.

Figure 23:
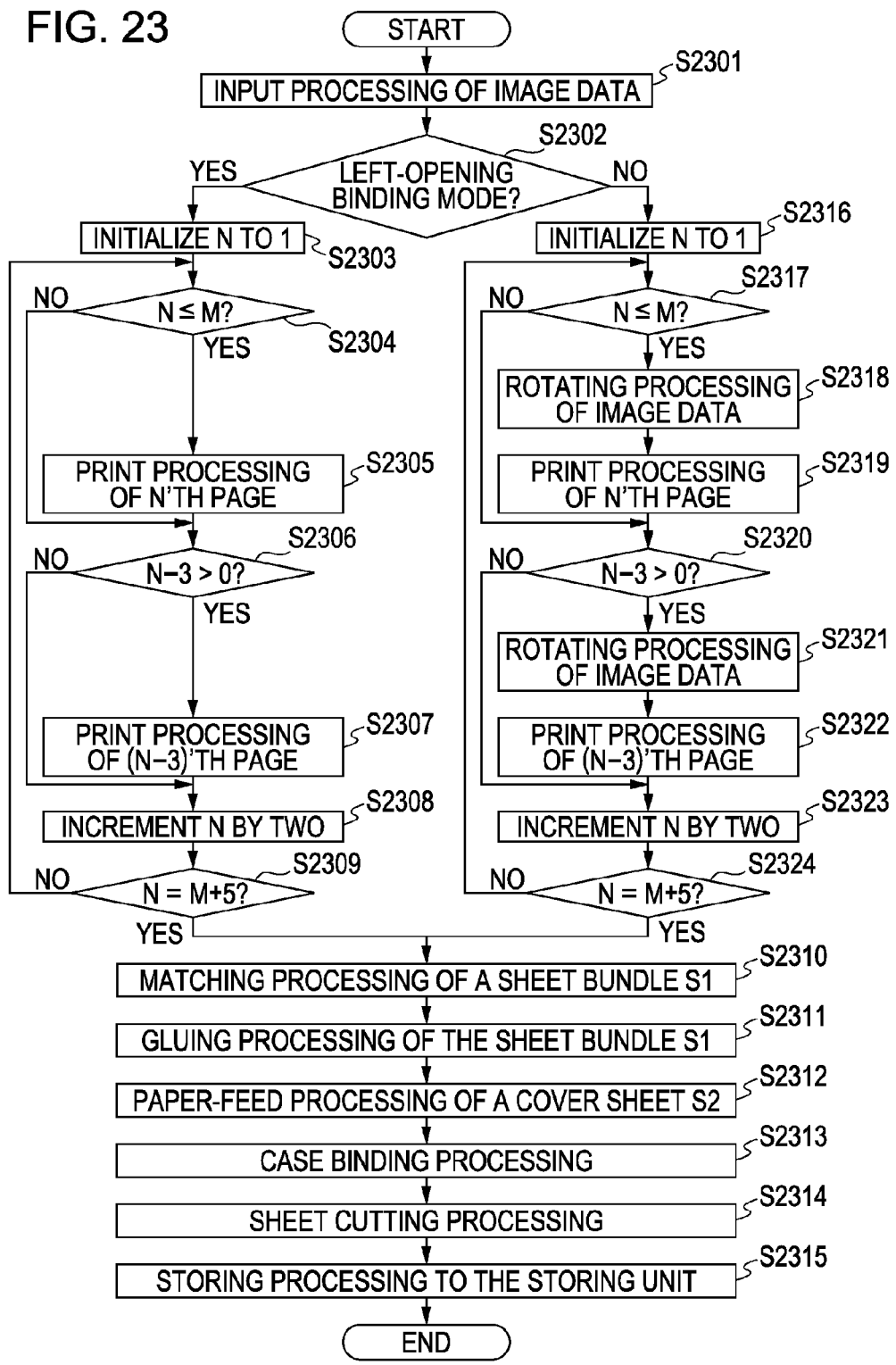
FIG. 23 is a flowchart of bookbinding processing when duplex printing is selected according to a second embodiment.

Note that steps S2310 through S2315 in FIG. 23 are the same as steps S1510 through S1515 in FIG. 15, so description thereof will be omitted. Also, steps S2316 through S2324 are the same as steps S2303 through S2309 except for steps S2318 and S2321.

In step S2318, the CPU 205 controls the rotating unit 231 to execute the rotating processing of image data of the N'th page. In step S2321, the CPU 205 also controls the rotating unit 231 to execute the rotating processing of image data of the N'th page. Note that the rotating unit 231 executes rotating processing such that the top-and-bottom directions of image data following rotating processing become the directions opposite of the top-and-bottom directions of image data prior to rotating processing. Also, a diagram schematically illustrating the sheet bundle S1 stacked in the stacking tray 42 is the same as FIG. 18. However, the top-and-bottom directions of image data on the sheets S differ between in the case of the left-opening bookbinding mode and in the case of the right-opening bookbinding mode. Specifically, the near-side direction of the bookbinding device 2000 is the bottom of image data in the left-opening bookbinding mode, and the near-side direction of the bookbinding device 2000 is the top of image data in the right-opening bookbinding mode.

As described with FIGS. 22 and 23, the CPU 205 controls the printer unit 203 such that the top-and-bottom directions of image data differ between in the case of the right-opening bookbinding mode and in the case of the left-opening bookbinding mode at the time of executing case binding processing. Now, description will be made regarding effects unique to the present embodiment, with reference to FIG. 24.

Figure 24:
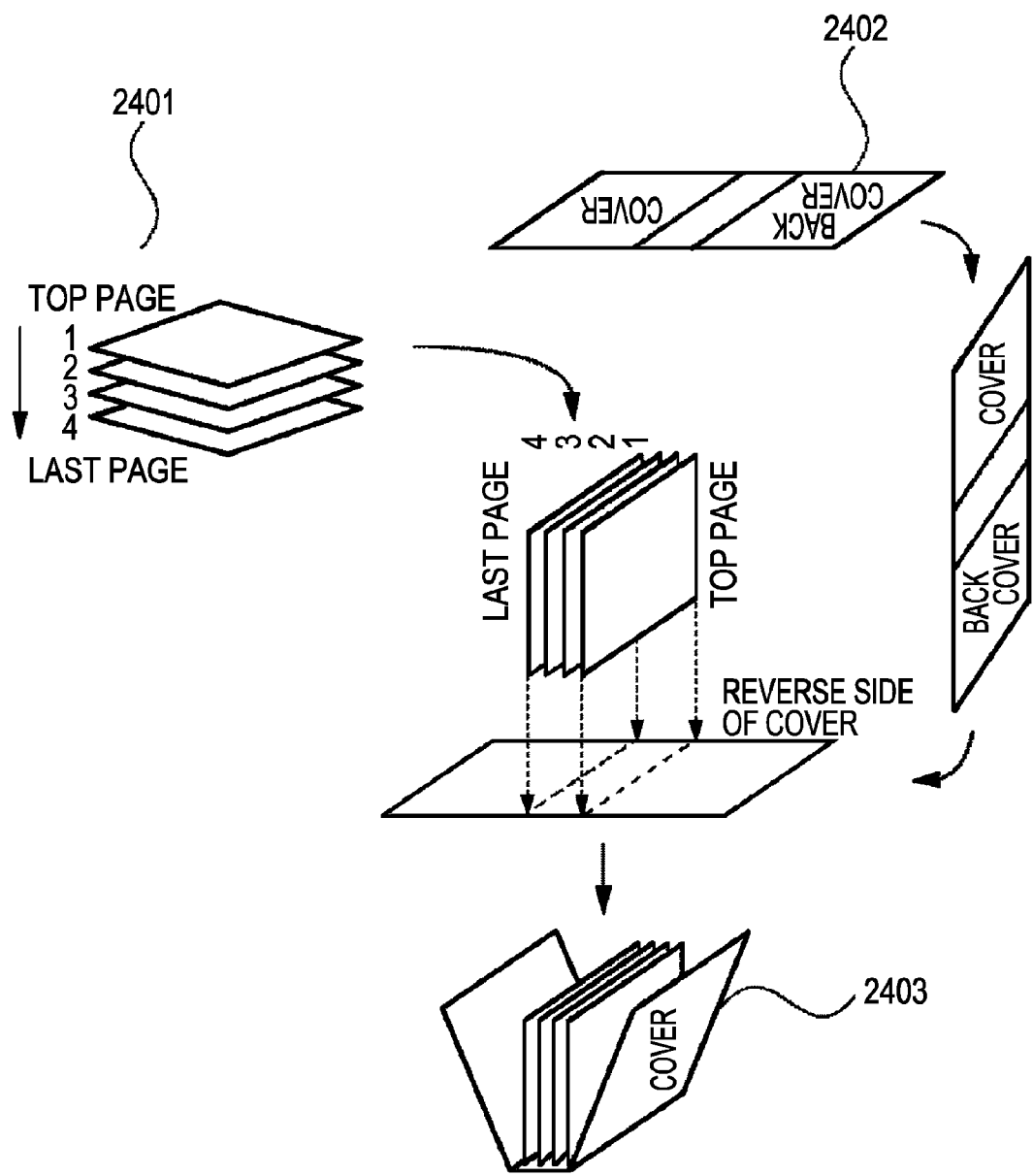
FIG. 24 is a diagram schematically illustrating a process of constructing a book in the left-opening bookbinding mode according to an embodiment.

FIG. 24 is a diagram schematically illustrating a process of constructing a book in the left-opening bookbinding mode according to an embodiment of present invention. In FIG. 24, reference numeral 2401 denotes the sheet bundle S1 stacked in the stacking tray 42, and 2402 denotes the cover sheet S2 loaded in the cover sheet loading tray 70. Also, reference numeral 2403 denotes the book S3 created by gluing the cover sheet S2 to the sheet bundle S1.

Note that the process of constructing a book in the right-opening bookbinding mode is the same as illustrated in FIG. 20.

With the loading direction of the cover sheet S2 loaded in the cover sheet loading tray 70, the top-and-bottom directions of the cover sheet S2 are inverted. On the other hand, the sheet S on which the top page is subjected to print processing is loaded in the lowermost side in both cases of 2401 and 2001. That is to say, it is not necessary for the CPU 205 of the bookbinding system 2000 to change over the print sequence depending on the case of the right-opening bookbinding mode and the case of the left-opening bookbinding mode.

Therefore, according to the second embodiment, a book can be created appropriately in light of regarding whether to create a right-opening book or a left-opening book without causing deterioration in productivity due to changing the print sequence of image data of multiple pages.

Note that with the second embodiment, it is necessary for the operator of the bookbinding system 2000 to change over the loading direction of the cover sheet depending on the case of the right-opening bookbinding mode or the case of the left-opening bookbinding mode. Accordingly, it is effective to notify the operator of the loading direction of a cover sheet depending on the case of the right-opening bookbinding mode or the case of the left-opening bookbinding mode. Specifically, when setting the left-opening bookbinding mode, it can be realized to notify the operator by outputting display so as to load the cover sheet S2 such as shown in 2401 in FIG. 24. It is desirable to perform this notification following the operator pressing the left-opening key 701 in FIG. 7A prior to displaying FIG. 7B. Also, when setting the right-opening bookbinding mode, it can be realized to notify the operator by outputting display so as to load the cover sheet S2 such as shown in 2001 in FIG. 20. It is desirable to perform this notification following the operator pressing the right-opening key 702 in FIG. 7A prior to displaying FIG. 7B.

Third Exemplary Embodiment

Next, description will be made regarding a third embodiment of the present invention with the appended drawings.

With the first embodiment, the print sequence has been controlled so as to invert the print sequence without changing over the loading direction of a cover sheet depending on the case of the right-opening bookbinding mode or the case of the left-opening bookbinding mode. Also, the second embodiment is an embodiment for changing over the loading direction of a cover sheet depending on the case of the right-opening bookbinding mode or the case of the left-opening bookbinding mode, assuming that the print sequence is the same.

On the other hand, the third embodiment is an embodiment for changing over the operations according to the first embodiment and the operations according to the second embodiment depending on the settings by the operator of the bookbinding system 2000.

Figure 25:
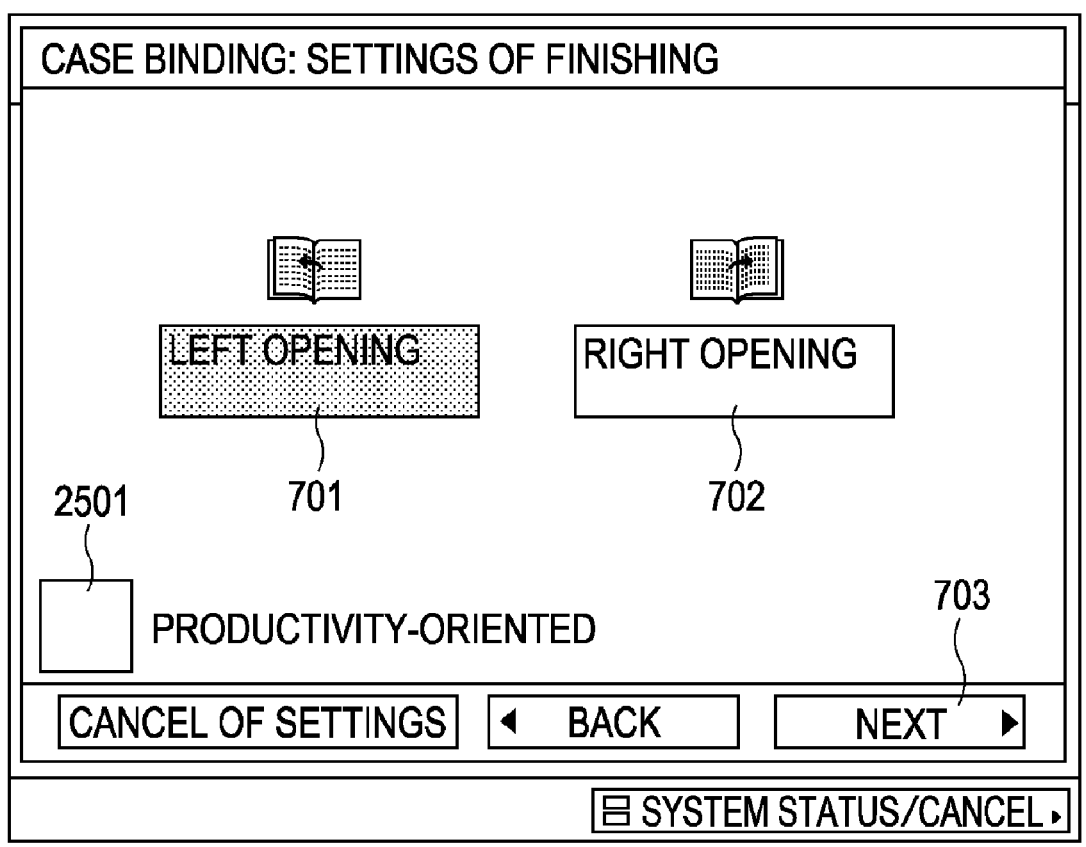
FIG. 25 is a diagram illustrating one example of the operating screen displayed on the liquid crystal display unit illustrated in FIG. 4.

The first and second embodiments have had the operator select one of the left-opening key 701 and the right-opening key 702 in FIG. 7C. On the other hand, with the third embodiment, the CPU 205 controls the liquid crystal display portion 4-253 to display the screen illustrated in FIG. 25 instead of FIG. 7C. In FIG. 25, in addition to the left-opening key 701 and the right-opening key 702 in FIG. 7C, a productivity preference key 2501 is added. The operator of the bookbinding system 2000 selects a productivity preference mode by pressing the productivity preference key 2501, and selects an operability preference mode by not pressing the productivity preference key 2501.

<Bookbinding Processing Execution Procedures: Simplex Printing>

In the event that the operator has set for only the single sides of the sheets S to be subjected to print processing in FIG. 7D, and also has selected the productivity preference mode, the CPU 205 performs the following operation. That is the operation for executing the flow illustrated in FIG. 22. The flow illustrated in FIG. 22 does not change the print sequence of image data of multiple pages, which provides an advantage wherein productivity is not changed both in the case of the right-opening bookbinding mode and in the case of the left-opening bookbinding mode.

On the other hand, in the event that the operator has set the operability preference mode, the CPU 205 performs the following operation. That is the operation for executing the flow illustrated in FIG. 14. With the flow illustrated in FIG. 14, there is no need to change over the loading direction (top-and-bottom directions) of the cover sheet S2 both in the case of the right-opening bookbinding mode and in the case of the left-opening bookbinding mode, which provides an advantage in that operability is excellent.

<Bookbinding Processing Execution Procedures: Duplex Printing>

In the event that the operator has set for both sides of the sheets S to be subjected to print processing in FIG. 7D, and also has selected the productivity preference mode, the CPU 205 performs the following operation. That is the operation for executing the flow illustrated in FIG. 23. The flow illustrated in FIG. 23 does not change the print sequence of image data of multiple pages, which provides an advantage wherein productivity is not changed both in the case of the right-opening bookbinding mode and in the case of the left-opening bookbinding mode.

On the other hand, in the event that the operator has set the operability preference mode, the CPU 205 performs the following operation. That is the operation for executing the flow illustrated in FIG. 15. With the flow illustrated in FIG. 15, there is no need to change over the loading direction (top-and-bottom directions) of the cover sheet S2 both in the case of the right-opening bookbinding mode and in the case of the left-opening bookbinding mode, which provides an advantage wherein operability is excellent.

As described above, the third embodiment is an embodiment for changing over the operations according to the first embodiment and the operations according to the second embodiment depending on the settings by the operator of the bookbinding system 2000. Accordingly, a book can be appropriately created in light of regarding whether the operator desires bookbinding processing that puts emphasis on productivity, or bookbinding processing that puts emphasis on operability.

Other Embodiments

With the above first through third embodiments, the bookbinding system 2000 has been a system for automatically conveying the sheets S conveyed from the printing device 105 to the case binding device 103 without requesting the operator's works. However, an arrangement may be made wherein the sheets S are temporarily discharged in a discharge tray (not shown) included in the printing device 105 to form the sheet bundle S1, and the operator conveys the formed sheet bundle S1, thereby stacking this in the stacking tray 42. In this case, the case binding device 103 performs case binding processing using the cover sheet S loaded in the cover sheet loading tray 70 following the operator stacking the sheet bundle S1 in the stacking tray 42.

In the event of applying the above arrangement to the first embodiment, the operator should load the sheet bundle S1 stacked in the discharge tray in the stacking tray 42 without changing the loading direction of the sheet bundle S1 without particularly considering whether or not the sheet bundle S1 is created as a right-opening book. That is to say, the operator can create a book appropriately in light of regarding whether to create a right-opening book or a left-opening book without deteriorating the operability of the operator.

Also, in the event of applying the above arrangement to the second embodiment, the operator needs to load the sheet bundle S1 in the stacking tray 42 in light of regarding whether or not the sheet bundle S1 is created as a right-opening book. However, there is no need to change the print sequence both in the case of creating a right-opening book and in the case of creating a left-opening book, and accordingly, productivity is not deteriorated depending on whether to create a right-opening book or a left-opening book.

Also, with the first through third embodiments, the bookbinding system 2000 has included the case binding device 103 for executing case binding processing, but may include a device for executing other bookbinding processing. For example, a device for executing staple processing following wrapping the sheet bundle S1 in the cover sheet S2 without gluing may be employed instead of gluing the spine cover portion 1002 of the cover sheet S2 on which a front cover and a back cover are laid out. In this case, the sheet bundle S1 and the cover sheet S2 are subjected to matching by staple needles. Also, a device may be employed wherein the cover sheet S2 on which a cover is laid out is fed from the cover sheet loading tray 70, and the sheet bundle S1 and the cover sheet S2 are subjected to binding processing using a binder tape or the like. In this case, the sheet bundle S1 and the cover sheet S2 are subjected to matching by a binder tape.

Also, with the first through third embodiments, the bookbinding system 2000 is a system for determining whether to set the right-opening bookbinding mode or the left-opening bookbinding mode based on the setting by the operator, but other arrangements may be employed. For example, the right-opening bookbinding mode is frequently employed at the time of subjecting portrait originals to bookbinding processing, and the left-opening bookbinding mode is frequently employed at the time of subjecting landscape originals to bookbinding processing. Accordingly, the CPU 205 may determine from the image on the original scanned by the scanner unit 201 whether the scanned original is a portrait original or a landscape original. In this case, the CPU 205 automatically sets the right-opening bookbinding mode in the event of determining that the scanned original is a portrait original, and automatically sets the left-opening bookbinding mode in the event of determining that the scanned original is a landscape original. Employing such an arrangement enables the right-opening bookbinding mode or the left-opening bookbinding mode to be set automatically appropriately without the operator explicitly setting the right-opening bookbinding mode or the left-opening bookbinding mode.

Also, the present invention provides a recording medium in which software program code for realizing the above embodiment functions is recorded, which can be supplied to a system or device. In this case, the computer of the system or device thereof reads out and executes the program code stored in the recording medium, thereby realizing the above embodiment functions. In this case, the program code itself read out from the recording medium realizes the above embodiment functions, and the recording medium storing the program code thereof makes up the present invention.

As many apparently widely different embodiments of the present invention can be made without departing from the spirit and scope thereof, it is to be understood that the invention is not limited to the specific embodiments thereof except as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-020972 filed Jan. 30, 2006, which is hereby incorporated by reference herein in its entirety.

What is claimed is:

1. A bookbinding apparatus comprising:
    an input unit configured to input image data of multiple pages;
    a printing unit configured to subject multiple sheets to print processing based on the image data of multiple pages input by the input unit;
    a stacking unit configured to stack the multiple sheets subjected to print processing by the printing unit as a sheet bundle;
    a paper-feed unit configured to feed a cover sheet;
    a bookbinding unit configured to perform a binding process for generating a book by binding the cover sheet to the sheet bundle;
    a mode setting unit configured to set one of a right-opening bookbinding mode for performing the binding process which generates a right-opening book and a left-opening bookbinding mode for performing the binding process which generates a left-opening book;
    a rotating unit configured to execute rotating processing for changing the top and bottom directions of the image data so that a first direction of the image data in the right-opening bookbinding mode and a second direction of the image data in the left-opening bookbinding mode are opposite; and
    a notification unit configured to notify, before the binding process is started by the bookbinding unit, an operator of the bookbinding apparatus that it is necessary to change the top and bottom directions at the time of loading the cover sheet to the paper-feed unit in a case where the mode setting unit has set the left-opening bookbinding mode so as to match the top and bottom directions of a sheet bundle stacked in the stacking unit and the to and bottom directions of the cover sheet, wherein the notification unit does not notify the operator of the book binding apparatus that it is necessary to change the top and bottom directions at the time of loading the cover sheet to the paper-feed unit in a case where the mode setting unit has set the right-opening bookbinding mode.

2. The bookbinding apparatus according to claim 1, wherein the input unit inputs the image data of multiple pages by scanning images on the multiple manuscripts.

3. The bookbinding apparatus according to claim 1, wherein the input unit inputs the image data of multiple pages by receiving a print job including the image data of multiple pages from an external device.

4. The bookbinding apparatus according to claim 1, wherein the cover sheet is laid out with a cover and a back cover; and
wherein the bookbinding unit generates the book by gluing between one end of the sheet bundle and a portion of the cover sheet serving as the spine of the book.

5. A method for controlling a bookbinding apparatus for performing a binding process generating a book using a sheet bundle made up of multiple sheets serving as body, and a cover sheet, the method comprising:
receiving image data of multiple pages;
setting one of a right-opening bookbinding mode for performing the binding which generates a right-opening book and a left-opening bookbinding mode for performing the binding process which generates a left-opening book;
executing rotating processing for changing the top and bottom directions of the image data so that a first direction of the image data in the right-opening bookbinding mode and a second direction of the image data in the left-opening bookbinding mode are opposite;
subjecting multiple sheets to print processing based on the image data of multiple pages passing through the rotating process, and subjecting one sheet to print processing based on image data of one page;
stacking the multiple sheets on which the image data of multiple pages are printed as a sheet bundle;
feeding a cover sheet;
binding a cover sheet to a sheet bundle made up of multiple sheets subjected to print processing in the printing process; and
notifying, before the binding process is started, an operator of the bookbinding apparatus that it is necessary to change the top and bottom directions at the time of loading the cover sheet to the paper-feed unit in a case where the left-opening bookbinding mode is set so as to match the top and bottom directions of a stacked sheet bundle and the top and bottom directions of the cover sheet, wherein the operator of the book binding apparatus is not notified that it is necessary to change the to and bottom directions at the time of loading the cover sheet to the paper-feed unit in a case where the right-opening bookbinding mode is set.

6. A printing apparatus capable of connecting to a bookbinding apparatus including
a stacking unit configured to stack a sheet bundle,
a paper-feed unit configured to feed a cover sheet, and
a bookbinding unit configured to perform a binding process for generating a book by binding the cover sheet to the sheet bundle,
the printing apparatus comprising:
an input unit configured to input image data of multiple pages;
a printing unit configured to subject multiple sheets to print processing based on the image data of multiple pages input by the input unit to stack these in the stacking unit of the bookbinding device;
a mode setting unit configured to set one of a right-opening bookbinding mode for performing the binding process which generates a right-opening book and a left-opening bookbinding mode for performing the binding process which generates a left-opening book;
a rotating unit configured to execute rotating processing for changing the top and bottom directions of the image data so that a first direction of the image data in the right-opening bookbinding mode and a second direction of the image data in the left-opening bookbinding mode are opposite; and
a notification unit configured to notify, before the binding process is started by the bookbinding unit, an operator of the bookbinding apparatus that it is necessary to change the top and bottom directions at the time of loading the cover sheet to the paper-feed unit in a case where the mode setting unit has set the left-opening bookbinding mode so as to match the top and bottom directions of a sheet bundle stacked in the stacking unit and the to and bottom directions of the cover sheet, wherein the notification unit does not notify the operator of the book binding apparatus that it is necessary to change the top and bottom directions at the time of loading the cover sheet to the paper-feed unit in a case where the mode setting unit has set the right-opening bookbinding mode.

7. The printing apparatus according to claim 6, wherein the input unit inputs the image data of multiple pages by scanning images on the multiple manuscripts.

8. The printing apparatus according to claim 6, wherein the input unit inputs the image data of multiple pages by receiving a print job including the image data of multiple pages from an external device.

* * * * *